(12) United States Patent
Bondesen et al.

(10) Patent No.: US 9,721,248 B2
(45) Date of Patent: Aug. 1, 2017

(54) ATM TOKEN CASH WITHDRAWAL

(71) Applicant: BANK OF AMERICA CORPORATION, Charlotte, NC (US)

(72) Inventors: Laura Corinne Bondesen, Charlotte, NC (US); Jason P. Blackhurst, Charlotte, NC (US); Scott Lee Harkey, Concord, NC (US); William Blakely Belchee, Charlotte, NC (US); Tammy L. Brunswig, Fort Mill, SC (US)

(73) Assignee: Bank of America Corporation, Charlotte, NC (US)

( * ) Notice: Subject to any disclaimer, the term of this patent is extended or adjusted under 35 U.S.C. 154(b) by 544 days.

(21) Appl. No.: 14/196,947

(22) Filed: Mar. 4, 2014

(65) Prior Publication Data
US 2015/0254655 A1 Sep. 10, 2015

(51) Int. Cl.
*G06Q 20/38* (2012.01)
*G06Q 20/40* (2012.01)
(Continued)

(52) U.S. Cl.
CPC ..... *G06Q 20/3821* (2013.01); *G06Q 20/3278* (2013.01); *G06Q 20/36* (2013.01);
(Continued)

(58) Field of Classification Search
CPC .......... G06Q 20/3821; G06Q 20/4012; G06Q 20/3278; G06Q 20/36; G06Q 20/385; G07F 19/20
(Continued)

(56) References Cited

U.S. PATENT DOCUMENTS 3,119,103 A 1/1964 Fertig
3,254,000 A 5/1966 Chibret
(Continued)

FOREIGN PATENT DOCUMENTS

WO WO 2012058099 5/2012
WO 2013095486 A1 6/2013
WO WO 2013095486 6/2013

OTHER PUBLICATIONS

European Patent Application No. 01400506 filed on Feb. 28, 2001, and printed as document No. EP 1132876 A2 entitled "Electronic Wallet System with Secure Inter-purse Operations" by inventor Tang-Talpin et al.
(Continued)

*Primary Examiner* — Kenneth Bartley
(74) *Attorney, Agent, or Firm* — Michael A. Springs; Moore & Van Allen PLLC; Peter B. Stewart

(57) ABSTRACT

Embodiments of the invention are directed to a system for managing financial tokens associated with a financial account, whereby the system is directed towards generating and authenticating tokens associated with the financial account in order to grant access to a user to conduct financial transactions on the financial account using an Automated Teller Machine (ATM). The system is configured to generate a server token that is associated with at least one financial account; communicate, to a first mobile device, a server packet comprising at least the server token; receive, from an ATM, a security packet communicated from a second mobile device to the ATM comprising at least a device token; authenticate the device token, the authentication comprising comparing the device token with the server token, thereby resulting in a successful authentication of the device token; and communicate the successful authentication to the ATM.

25 Claims, 7 Drawing Sheets

(51) Int. Cl.
*G06Q 20/32* (2012.01)
*G07F 19/00* (2006.01)
*G06Q 20/36* (2012.01)

(52) U.S. Cl.
CPC ....... *G06Q 20/385* (2013.01); *G06Q 20/4012* (2013.01); *G07F 19/20* (2013.01)

(58) Field of Classification Search
USPC .................................................... 705/72, 76
See application file for complete search history.

(56) References Cited

U.S. PATENT DOCUMENTS

| | | |
|---|---|---|
| 3,256,670 A | 6/1966 | Tersigni |
| 3,330,546 A | 7/1967 | Bryan |
| 3,516,056 A | 6/1970 | Matthews |
| 3,658,393 A | 4/1972 | Luthi |
| 3,718,328 A | 2/1973 | Comstock |
| 4,766,293 A | 8/1988 | Boston |
| 5,438,186 A | 8/1995 | Nair et al. |
| 6,119,103 A | 9/2000 | Basch et al. |
| 6,254,000 B1 | 7/2001 | Degen et al. |
| 6,256,670 B1 | 7/2001 | Davies |
| 6,330,546 B1 | 12/2001 | Gopinathan et al. |
| 6,422,462 B1 | 7/2002 | Cohen |
| 6,516,056 B1 | 2/2003 | Justice et al. |
| 6,651,168 B1 | 11/2003 | Kao et al. |
| 6,658,393 B1 | 12/2003 | Basch et al. |
| 6,718,328 B1 | 4/2004 | Norris |
| 6,748,367 B1 | 6/2004 | Lee |
| 7,058,806 B2 | 6/2006 | Smeets et al. |
| 7,111,323 B1 | 9/2006 | Bhatia et al. |
| 7,136,835 B1 | 11/2006 | Flitcroft et al. |
| 7,177,838 B1 | 2/2007 | Ling |
| 7,328,189 B2 | 2/2008 | Ling |
| 7,337,144 B1 | 2/2008 | Blinn et al. |
| 7,398,250 B2 | 7/2008 | Blinn et al. |
| 7,596,530 B1 | 9/2009 | Glasberg |
| 7,606,560 B2 | 10/2009 | LaBrou et al. |
| 7,610,040 B2 | 10/2009 | Cantini et al. |
| 7,627,505 B2 | 12/2009 | Yoshida et al. |
| 7,657,489 B2 | 2/2010 | Stambaugh |
| 7,693,771 B1 | 4/2010 | Zimmerman et al. |
| 7,698,221 B2 | 4/2010 | Blinn et al. |
| 7,698,443 B2 | 4/2010 | Yaffe et al. |
| 7,739,169 B2 | 6/2010 | Hammad |
| 7,742,967 B1 | 6/2010 | Keresman, III et al. |
| 7,783,281 B1 | 8/2010 | Cook et al. |
| 7,784,684 B2 | 8/2010 | LaBrou et al. |
| 7,848,980 B2 | 12/2010 | Carlson |
| 7,946,480 B2 * | 5/2011 | Miller ................ G06Q 20/1085 235/379 |
| 7,992,779 B2 | 8/2011 | Phillips et al. |
| 8,012,219 B2 | 9/2011 | Mendez et al. |
| 8,032,932 B2 | 10/2011 | Speyer et al. |
| 8,171,531 B2 | 5/2012 | Buer |
| 8,245,915 B1 * | 8/2012 | Ramachandran .... G06K 7/0004 235/379 |
| 8,249,805 B2 | 8/2012 | de Silva et al. |
| 8,307,413 B2 | 11/2012 | Smadja et al. |
| 8,327,428 B2 | 12/2012 | Bailey et al. |
| 8,327,429 B2 | 12/2012 | Speyer et al. |
| 8,346,666 B2 | 1/2013 | Lindelsee et al. |
| 8,380,177 B2 | 2/2013 | Laracey |
| 8,395,242 B2 | 3/2013 | Oliver et al. |
| 8,407,142 B1 | 3/2013 | Griggs |
| 8,423,466 B2 | 4/2013 | Lanc |
| 8,498,940 B2 | 7/2013 | Pelegero et al. |
| 8,522,039 B2 | 8/2013 | Hyndman et al. |
| 8,572,689 B2 | 10/2013 | Radhakrishnan |
| 8,577,804 B1 | 11/2013 | Bacastow |
| 8,583,498 B2 | 11/2013 | Fried et al. |
| 8,584,251 B2 | 11/2013 | McGuire et al. |
| 8,589,271 B2 | 11/2013 | Evans |
| 8,590,008 B1 | 11/2013 | Ellmore |
| 8,595,812 B2 | 11/2013 | Bomar et al. |
| 8,620,790 B2 | 12/2013 | Priebatsch |
| 8,682,802 B1 | 3/2014 | Kannanari |
| 8,683,571 B2 | 3/2014 | Zapata et al. |
| 8,768,838 B1 | 7/2014 | Hoffman |
| 8,788,333 B2 | 7/2014 | Alba et al. |
| 8,788,429 B2 | 7/2014 | Ticken |
| 8,789,162 B2 | 7/2014 | Radhakrishnan |
| 8,839,383 B2 | 9/2014 | Van Horn |
| 8,850,575 B1 | 9/2014 | Magi Shaashua et al. |
| 8,930,271 B1 | 1/2015 | Ellis et al. |
| 8,943,574 B2 | 1/2015 | Bailey et al. |
| 8,973,102 B2 | 3/2015 | Jakobsson |
| 8,985,442 B1 | 3/2015 | Zhou et al. |
| 8,996,423 B2 | 3/2015 | Johnson et al. |
| 9,002,750 B1 * | 4/2015 | Chu .................... H04L 63/0838 705/55 |
| 9,055,053 B2 | 6/2015 | Radhakrishnan et al. |
| 9,069,943 B2 | 6/2015 | Radhakrishnan et al. |
| 9,195,984 B1 | 11/2015 | Spector et al. |
| 9,412,106 B2 * | 8/2016 | Laracey ............. G06Q 20/1085 |
| 2002/0111907 A1 | 8/2002 | Ling |
| 2002/0157029 A1 | 10/2002 | French et al. |
| 2002/0174073 A1 | 11/2002 | Nordman et al. |
| 2002/0186845 A1 | 12/2002 | Dutta et al. |
| 2003/0004866 A1 | 1/2003 | Huennekens et al. |
| 2003/0045328 A1 | 3/2003 | Natsuno |
| 2003/0061170 A1 | 3/2003 | Uzo |
| 2003/0105714 A1 | 6/2003 | Alarcon-Luther et al. |
| 2003/0163787 A1 | 8/2003 | Hay et al. |
| 2005/0222961 A1 | 10/2005 | Staib et al. |
| 2006/0036868 A1 | 2/2006 | Cicchitto |
| 2006/0089893 A1 * | 4/2006 | Joseph ............... G06Q 20/1085 705/35 |
| 2006/0206709 A1 * | 9/2006 | Labrou ................. G06Q 20/18 713/167 |
| 2006/0287004 A1 | 12/2006 | Fuqua |
| 2007/0055594 A1 | 3/2007 | Rivest et al. |
| 2007/0100773 A1 | 5/2007 | Wallach |
| 2007/0156842 A1 | 7/2007 | Vermeulen et al. |
| 2007/0194884 A1 | 8/2007 | Didier et al. |
| 2007/0203835 A1 * | 8/2007 | Cai ....................... G06Q 40/00 705/43 |
| 2007/0219984 A1 | 9/2007 | Aravamudan et al. |
| 2007/0223706 A1 | 9/2007 | Gantman et al. |
| 2007/0250920 A1 | 10/2007 | Lindsay |
| 2007/0276764 A1 | 11/2007 | Mann, III et al. |
| 2008/0109319 A1 | 5/2008 | Foss |
| 2008/0162338 A1 | 7/2008 | Samuels et al. |
| 2008/0162589 A1 | 7/2008 | Rodeheffer et al. |
| 2008/0167965 A1 | 7/2008 | Von Nothaus et al. |
| 2008/0189210 A1 | 8/2008 | Sawhney |
| 2008/0195499 A1 | 8/2008 | Meredith et al. |
| 2008/0275748 A1 | 11/2008 | John |
| 2008/0293397 A1 | 11/2008 | Gajdos et al. |
| 2008/0313087 A1 * | 12/2008 | Joseph ............... G06Q 20/1085 705/66 |
| 2008/0319889 A1 | 12/2008 | Hammad |
| 2009/0006230 A1 | 1/2009 | Lyda et al. |
| 2009/0019534 A1 | 1/2009 | Bakshi et al. |
| 2009/0048953 A1 | 2/2009 | Hazel et al. |
| 2009/0057396 A1 | 3/2009 | Barbour et al. |
| 2009/0100529 A1 | 4/2009 | Livnat et al. |
| 2009/0119190 A1 | 5/2009 | Realini |
| 2009/0150286 A1 | 6/2009 | Barton |
| 2009/0164327 A1 | 6/2009 | Bishop et al. |
| 2009/0328186 A1 * | 12/2009 | Pollutro ................ G06F 21/31 726/13 |
| 2010/0036741 A1 | 2/2010 | Cleven |
| 2010/0051686 A1 * | 3/2010 | Obi ....................... G06Q 20/12 235/379 |
| 2010/0064345 A1 | 3/2010 | Bentley et al. |
| 2010/0070376 A1 | 3/2010 | Proud et al. |
| 2010/0122333 A1 | 5/2010 | Noe |
| 2010/0235882 A1 | 9/2010 | Moore |
| 2010/0241571 A1 | 9/2010 | McDonald |
| 2010/0257099 A1 | 10/2010 | Bonalle et al. |
| 2010/0268645 A1 | 10/2010 | Martino et al. |
| 2010/0312636 A1 | 12/2010 | Coulter et al. |

(56) References Cited

U.S. PATENT DOCUMENTS

| | | |
|---|---|---|
| 2011/0022483 A1 | 1/2011 | Hammad |
| 2011/0099104 A1 | 4/2011 | Nybom |
| 2011/0103586 A1 | 5/2011 | Nobre |
| 2011/0137804 A1 | 6/2011 | Peterson |
| 2011/0143663 A1* | 6/2011 | Renard .................. G06Q 20/32 455/41.1 |
| 2011/0166992 A1 | 7/2011 | Dessert et al. |
| 2011/0218907 A1 | 9/2011 | Dessert et al. |
| 2011/0251892 A1 | 10/2011 | Laracey |
| 2011/0277016 A1 | 11/2011 | Hockings et al. |
| 2012/0018506 A1 | 1/2012 | Hammad et al. |
| 2012/0023022 A1* | 1/2012 | Carroll .................. G06Q 20/32 705/44 |
| 2012/0023567 A1 | 1/2012 | Hammad |
| 2012/0028609 A1* | 2/2012 | Hruska .............. G06Q 20/3674 455/411 |
| 2012/0030047 A1 | 2/2012 | Fuentes et al. |
| 2012/0030109 A1 | 2/2012 | Dooley Maley et al. |
| 2012/0054057 A1 | 3/2012 | O'Connell et al. |
| 2012/0158540 A1 | 6/2012 | Ganti et al. |
| 2012/0158586 A1 | 6/2012 | Ganti et al. |
| 2012/0160912 A1* | 6/2012 | Laracey ............. G06Q 20/1085 235/379 |
| 2012/0166334 A1 | 6/2012 | Kimberg et al. |
| 2012/0171237 A1 | 7/2012 | Ching et al. |
| 2012/0179558 A1 | 7/2012 | Fischer |
| 2012/0197743 A1 | 8/2012 | Grigg et al. |
| 2012/0197794 A1 | 8/2012 | Grigg et al. |
| 2012/0197797 A1* | 8/2012 | Grigg ................. G06Q 20/1085 705/43 |
| 2012/0203700 A1 | 8/2012 | Ornce et al. |
| 2012/0252365 A1 | 10/2012 | Lam |
| 2012/0254941 A1 | 10/2012 | Levien et al. |
| 2012/0265679 A1* | 10/2012 | Calman ................. G07F 19/202 705/43 |
| 2012/0265688 A1* | 10/2012 | Dinan .................... G06Q 20/32 705/71 |
| 2012/0271712 A1 | 10/2012 | Katzin et al. |
| 2012/0290482 A1 | 11/2012 | Atef et al. |
| 2012/0316992 A1 | 12/2012 | Oborne |
| 2012/0317034 A1 | 12/2012 | Guha et al. |
| 2012/0323783 A1 | 12/2012 | Canetto |
| 2012/0330846 A1 | 12/2012 | Light et al. |
| 2013/0013499 A1 | 1/2013 | Kalgi |
| 2013/0018738 A1 | 1/2013 | Faires et al. |
| 2013/0018791 A1 | 1/2013 | Mendicino et al. |
| 2013/0024360 A1 | 1/2013 | Ballout |
| 2013/0036000 A1 | 2/2013 | Giordano et al. |
| 2013/0036048 A1 | 2/2013 | Campos et al. |
| 2013/0054336 A1 | 2/2013 | Graylin |
| 2013/0054470 A1 | 2/2013 | Campos et al. |
| 2013/0085927 A1 | 4/2013 | Scott |
| 2013/0097683 A1 | 4/2013 | Davis et al. |
| 2013/0110658 A1 | 5/2013 | Lyman et al. |
| 2013/0124346 A1 | 5/2013 | Baldwin et al. |
| 2013/0159178 A1 | 6/2013 | Colon et al. |
| 2013/0166332 A1 | 6/2013 | Hammad |
| 2013/0179341 A1 | 7/2013 | Boudreau |
| 2013/0179954 A1 | 7/2013 | Bidare |
| 2013/0191227 A1 | 7/2013 | Pasa et al. |
| 2013/0204775 A1 | 8/2013 | Midkiff et al. |
| 2013/0204787 A1 | 8/2013 | Dubois |
| 2013/0212007 A1 | 8/2013 | Mattsson et al. |
| 2013/0212019 A1 | 8/2013 | Mattsson et al. |
| 2013/0226799 A1* | 8/2013 | Raj .......................... G07C 9/00 705/44 |
| 2013/0246258 A1 | 9/2013 | Dessert |
| 2013/0246260 A1 | 9/2013 | Barten et al. |
| 2013/0254052 A1 | 9/2013 | Royyuru et al. |
| 2013/0254115 A1 | 9/2013 | Pasa et al. |
| 2013/0262315 A1 | 10/2013 | Hruska |
| 2013/0268437 A1 | 10/2013 | Desai et al. |
| 2013/0304637 A1 | 11/2013 | McCabe et al. |
| 2013/0304651 A1 | 11/2013 | Smith |
| 2013/0311365 A1* | 11/2013 | Miller ................. G06Q 20/1085 705/43 |
| 2013/0318627 A1 | 11/2013 | Lundkvist et al. |
| 2013/0346302 A1 | 12/2013 | Purves et al. |
| 2014/0006273 A1 | 1/2014 | Gopinath et al. |
| 2014/0012647 A1 | 1/2014 | Hecht |
| 2014/0025581 A1 | 1/2014 | Calman |
| 2014/0025958 A1 | 1/2014 | Calman |
| 2014/0095383 A1* | 4/2014 | Rao ....................... G06Q 20/383 705/43 |
| 2014/0122331 A1 | 5/2014 | Vaish et al. |
| 2014/0129357 A1 | 5/2014 | Goodwin |
| 2014/0130127 A1 | 5/2014 | Toole et al. |
| 2014/0143089 A1 | 5/2014 | Campos et al. |
| 2014/0143145 A1 | 5/2014 | Kortina |
| 2014/0156535 A1* | 6/2014 | Jabbour ............. G06Q 20/4012 705/72 |
| 2014/0164243 A1 | 6/2014 | Aabye et al. |
| 2014/0172707 A1 | 6/2014 | Kuntagod et al. |
| 2014/0187148 A1 | 7/2014 | Taite et al. |
| 2014/0188719 A1 | 7/2014 | Poornachandran et al. |
| 2014/0208401 A1 | 7/2014 | Balakrishnan et al. |
| 2014/0214640 A1 | 7/2014 | Mallikarjunan et al. |
| 2014/0244493 A1 | 8/2014 | Kenyon et al. |
| 2014/0244503 A1 | 8/2014 | Sadlier |
| 2014/0245391 A1 | 8/2014 | Adenuga |
| 2014/0250009 A1 | 9/2014 | Carlson |
| 2014/0258157 A1 | 9/2014 | Pridmore et al. |
| 2014/0279476 A1 | 9/2014 | Hua |
| 2014/0279554 A1 | 9/2014 | Priebatsch et al. |
| 2014/0279566 A1 | 9/2014 | Verma et al. |
| 2014/0279688 A1 | 9/2014 | Ginsberg et al. |
| 2014/0310764 A1 | 10/2014 | Tippett et al. |
| 2014/0315159 A1 | 10/2014 | Mukherjee et al. |
| 2014/0330721 A1 | 11/2014 | Wang |
| 2014/0337175 A1 | 11/2014 | Katzin et al. |
| 2014/0344153 A1 | 11/2014 | Raj et al. |
| 2014/0351125 A1* | 11/2014 | Miller ................. G06Q 20/1085 705/43 |
| 2015/0019317 A1 | 1/2015 | Mitchell |
| 2015/0019439 A1 | 1/2015 | Phillips |
| 2015/0032621 A1 | 1/2015 | Kar et al. |
| 2015/0032625 A1 | 1/2015 | Dill et al. |
| 2015/0032627 A1 | 1/2015 | Dill et al. |
| 2015/0039601 A1 | 2/2015 | Harrang et al. |
| 2015/0081557 A1 | 3/2015 | Kinfoil et al. |
| 2015/0081567 A1 | 3/2015 | Boyle et al. |
| 2015/0100495 A1 | 4/2015 | Salama et al. |
| 2015/0106275 A1* | 4/2015 | Wolfs ..................... G06Q 20/20 705/72 |
| 2015/0120569 A1 | 4/2015 | Belshe et al. |
| 2015/0120572 A1 | 4/2015 | Slade |
| 2015/0161610 A1 | 6/2015 | Sahadevan et al. |
| 2015/0170149 A1 | 6/2015 | Sharma et al. |
| 2015/0199679 A1 | 7/2015 | Palanisamy et al. |
| 2015/0206137 A1 | 7/2015 | Mazarim Fernandes |
| 2015/0220914 A1 | 8/2015 | Purves et al. |
| 2015/0254648 A1 | 9/2015 | Clements et al. |
| 2015/0254650 A1 | 9/2015 | Bondesen et al. |
| 2015/0254653 A1 | 9/2015 | Bondesen et al. |
| 2015/0254664 A1 | 9/2015 | Bondesen et al. |

OTHER PUBLICATIONS

Simon, "Credit-Card Reward Programs: A Short History"; Creditcards.com, Nov. 2006, 4 pages.

Lane, "History of APIs"; APIEvangelist.com; Dec. 2012, 11 pages.

"Digital wallet to pay for travel hasn't arrived yet", Orlando Sentinel [Orlando, Fla], Jan. 27, 2013: p. J.6.

"World's First and Only Global Mobile Wallet Sees Strong User Adoption with 150 Million Miles Loaded to Cash in First Month of Launch", Business Wire, Nov. 28, 2012, Zurich: pp. 1-3.

* cited by examiner

ATM TOKEN CASH WITHDRAWAL

BACKGROUND

Many modern financial institutions use automated teller machines (ATM) to enable customers to perform transactions on financial accounts. The ATM may or may not be associated with the financial institution; however, the ATM may still be used to perform a transaction on a financial account associated with the institution.

In order to perform a transaction on a financial account a customer is typically required to either swipe a card with a magnetic strip or scan a card with an embedded smart chip. The card is associated with the financial account. In addition to either swiping or scanning the card, the user will usually be required to enter a personal identification number (PIN) associated with the either the card or the financial account. Typically, after the ATM and/or a financial network has validated these credentials, the user will be allowed to perform the transaction.

In some instances, the potential exposure of a compromised card can be great because the card may complete access to funds deposited in the financial account. There exists a need to protect financial accounts from unauthorized access.

BRIEF SUMMARY

In some embodiments, a system for managing financial tokens associated with a financial account, whereby the system generates and authenticates tokens associated with the financial account in order to grant access to a user to conduct financial transactions on the financial account using an Automated Teller Machine (ATM). The system comprises a memory, a computing processor, and a module stored in memory, the module comprising instruction code executable by one or more computing processors, and configured to cause the one or more processors to: generate a server token, wherein the server token is associated with at least one financial transaction; communicate, to a first mobile device, a server packet, wherein the server packet comprises at least the server token; receive, ATM, a security packet communicate from a second mobile device to the ATM, wherein the security packet comprises at least a device token; authenticate the device token, the authentication comprising comparing the device token with the server token, thereby resulting in a successful authentication of the device token; and communicate the successful authentication to the ATM.

In some embodiments, the system is further configured to: generate a server personal identification number (PIN), wherein the server PIN is a sequence of characters; and associate the server PIN with the server token; wherein, the server packet further comprises the server PIN; wherein the security packet further comprises a user inputted PIN; and wherein authenticating the device token further comprises comparing the server PIN with the user submitted PIN.

In some embodiments, generating the server PIN comprises retrieving a customer PIN associated with a customer, wherein the server PIN is generated at least in part on the customer PIN.

In some embodiments, generating the server PIN comprises generating a random PIN, wherein the server PIN may be based at least in part on the random PIN.

In some embodiments, the module is further configured to cause the processor to disable the server token after the system has authenticated the device token associated with the server token, thereby preventing the system from authenticating a second device token associated the server token a second time.

In some embodiments, the module is further configured to cause the processor to receive a transaction communication from the ATM wherein the transaction communication comprises an amount of money and the device token; and debit a financial account, by the amount of money, associated with the device token.

In some embodiments, the security packet received by the system is encrypted; and wherein authenticating the device token further comprises decrypting the security packet thereby resulting in the system obtaining at least the device token.

In some embodiments, the module is further configured to cause the processor to store an identification marker for the first mobile device associated with the server token; wherein, the security packet further comprises an identification marker for the second mobile device; and wherein, authenticating the device token comprises comparing the identification marker for the first mobile device and the identification marker for the second mobile device.

In some embodiments, the server token is associated with a list of identification markers of at least on authorized ATM; and wherein the security packet further comprises an identification marker for a requested ATM; and wherein authenticating the device token further comprises the identification marker for the requested ATM with the list of ATM identification markers.

In some embodiments, an apparatus for handling financial transactions on a financial account associated with a token, whereby the apparatus utilizes preconfigured security measures in order to provide access to a user to conduct financial transactions on the financial account associated with the token and communicates responses regarding the security measures to a remote server. The apparatus comprises: a memory, a computing processor, and a module stored in memory, the module comprising instruction code executable by one or more processors, and configured to cause the one or more processors to: receive, from the mobile device, an authorized request, wherein the authorization request comprises at least a device token and wherein the device token is associated with at least on financial account; generate a security packet, wherein the security packet comprises at least the device token; receive, from the remote server, an authentication response, thereby resulting in a successful authentication of the device token; and grant access, to a user, to perform at least one financial transaction associated with the device token based at least in part on the successful authentication of the device token.

In some embodiments, the apparatus is further configured to: request a user submitted PIN, wherein the user submitted PIN is a sequence of characters; receive the user submitted PIN; and wherein, the security packet further comprises the user submitted PIN.

In some embodiments, the apparatus further comprises a keypad; and wherein, receiving the user submitted PIN comprises recording a user entering a PIN using the keypad.

In some embodiments, the authorization request further comprises the user submitted PIN; and wherein, receiving the user submitted PIN comprises extracting the user submitted PIN from the authorization request.

In some embodiments, the apparatus further comprises a near field communications (NFC) reader; wherein, receiving the authorization request from the user comprises: receiving, using the NFC reader, pairing request from the mobile device; sending, to the mobile device, a pairing response thereby, resulting in a successful pairing between the apparatus and the mobile device; and receiving, from the mobile device via the NFC reader, the authorization request.

In some embodiments, the apparatus is further configured to send a transaction communication wherein the transaction communication comprising at least information indicating an amount of money and the device token.

In some embodiments, generating the security packet comprises encrypting the security packet.

In some embodiments, the at least one financial transaction associated with the device token is at least of a money withdrawal from an account associated with the device token, a transfer of money between accounts associated with the device token, viewing a balance of an account associated with the device token; and making a deposit into an account associated with the device token.

In some embodiments, receiving the device token further comprises receiving an identification marker for the mobile device; and wherein the security packet further comprises the identification marker for the mobile device.

In some embodiments, the security packet further comprises an identification marker for the apparatus.

In some embodiments, a device for handling tokens associated with a financial account, whereby the device stores and communicates tokens for the purpose of granting access to a user to conduct financial transactions on the financial account associated with the token. The device comprising: a memory; a computing processor; and a module stored in the memory, the module comprising instruction code executable by once or more processors, and configured to cause the one or more processors to: receive a server token from a remote server, wherein the server token is associated with at least one financial account; store the server token in memory, wherein the server token is stored in a persistent state and wherein the processor is capable of retrieving the server token from the persistent state; receive input, from a user, to request authorization from an ATM to perform at least one financial transaction on the at least on account associated with the server token; and in response to receiving the user input, communicate to an ATM, an authorization request wherein the authorization request comprises at least the server token stored in memory, thereby making a request to perform at least one financial transaction associated with the token.

In some embodiments, the device further comprises an NFC emitter; and wherein the communicating the authorization request to the ATM comprises: sending, using the NFC emitter to the ATM, a pairing request, wherein the pairing request comprises a signal with an embedded message comprising at least one of an identification marker for the device, a time stamp, an identification marker associated with a financial institution, information regarding an owner of the device, and proprietary information; receiving, from the ATM a pairing response, thereby resulting in a successful pairing between the device and the ATM, the response comprising at least one of an identification marker for the ATM, a geo-location for the ATM, and information regarding a manager of the ATM; and communicating, using the emitter, the token to the ATM.

In some embodiments, the device is further configured to: request, from a user, a user submitted PIN, wherein the user submitted PIN is a sequence of characters and wherein the method of input for the user submitted PIN comprises at least a touchpad, a touchscreen with a simulated touchpad, vocal recognition, and biometric data; and include the user submitted PIN in the authorization request.

In some embodiments, the device is further configured to encrypt the authorization request prior to communicating the authorization request to the ATM, wherein encrypting the data comprises at least one of using a digest wherein the token is transformed into an irreversible digest, and a reversible encryption.

In some embodiments, communicating the authorization request to the ATM further comprises, communicating an identification marker for the device, wherein the identification marker is at least one of a media access control (MAC) address, a timestamp, an internet protocol (IP) address, and information regarding the owner of the device.

BRIEF DESCRIPTION OF THE DRAWING

Figure 1:
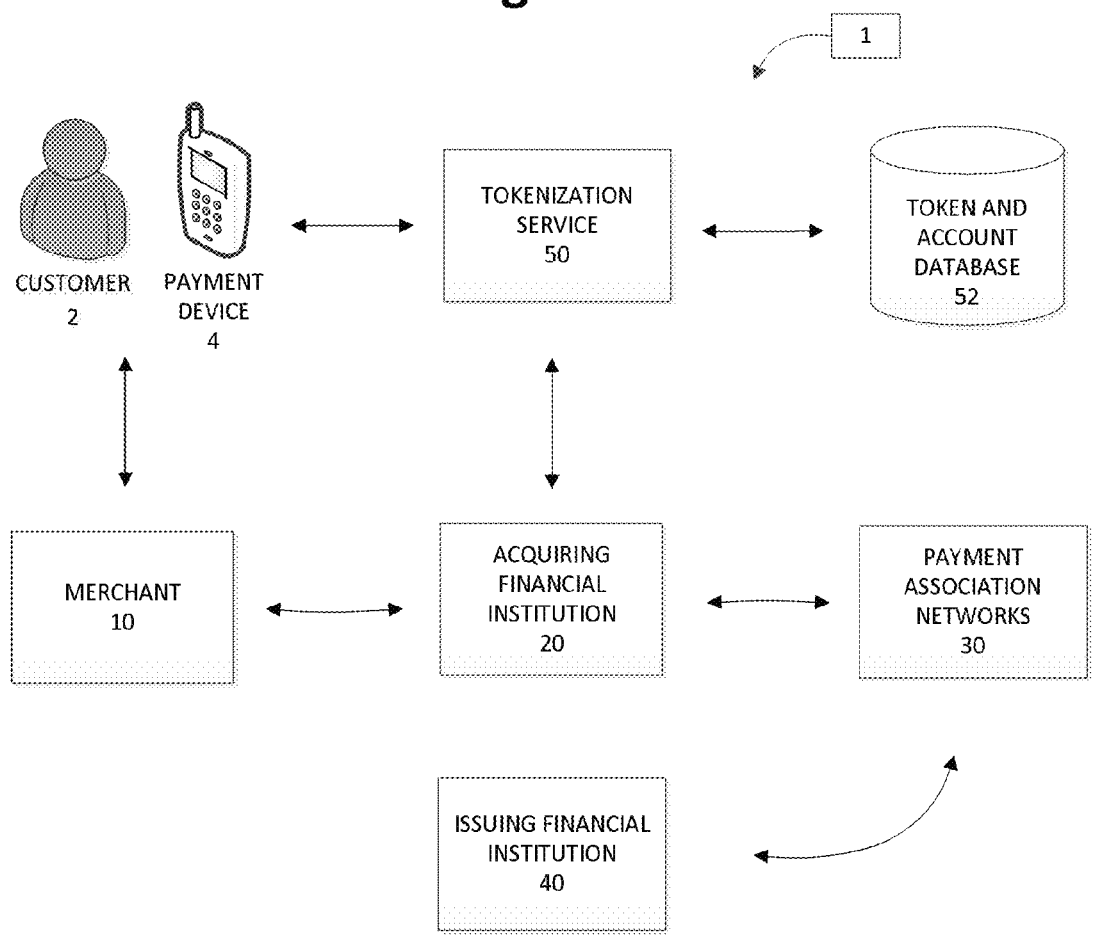
Figure 2:
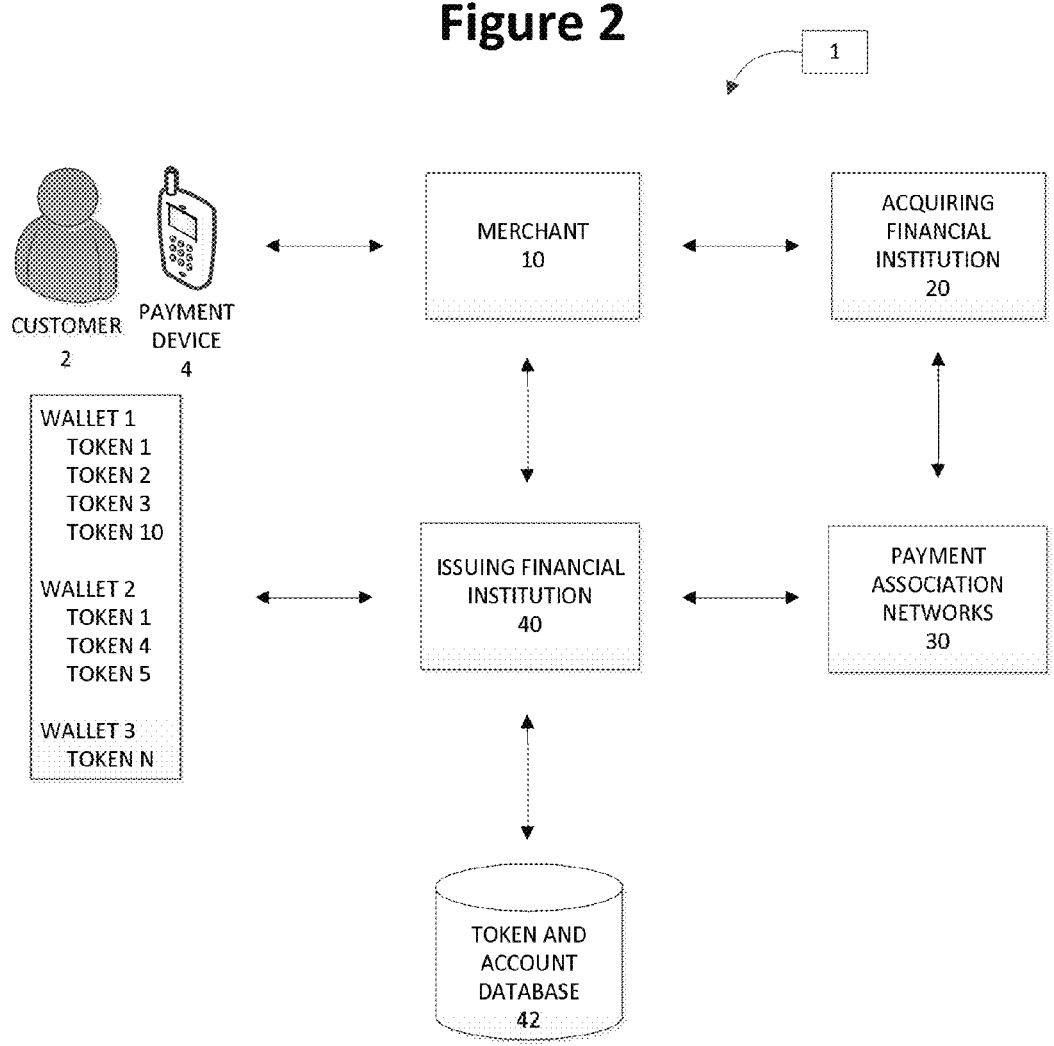
Figure 3:
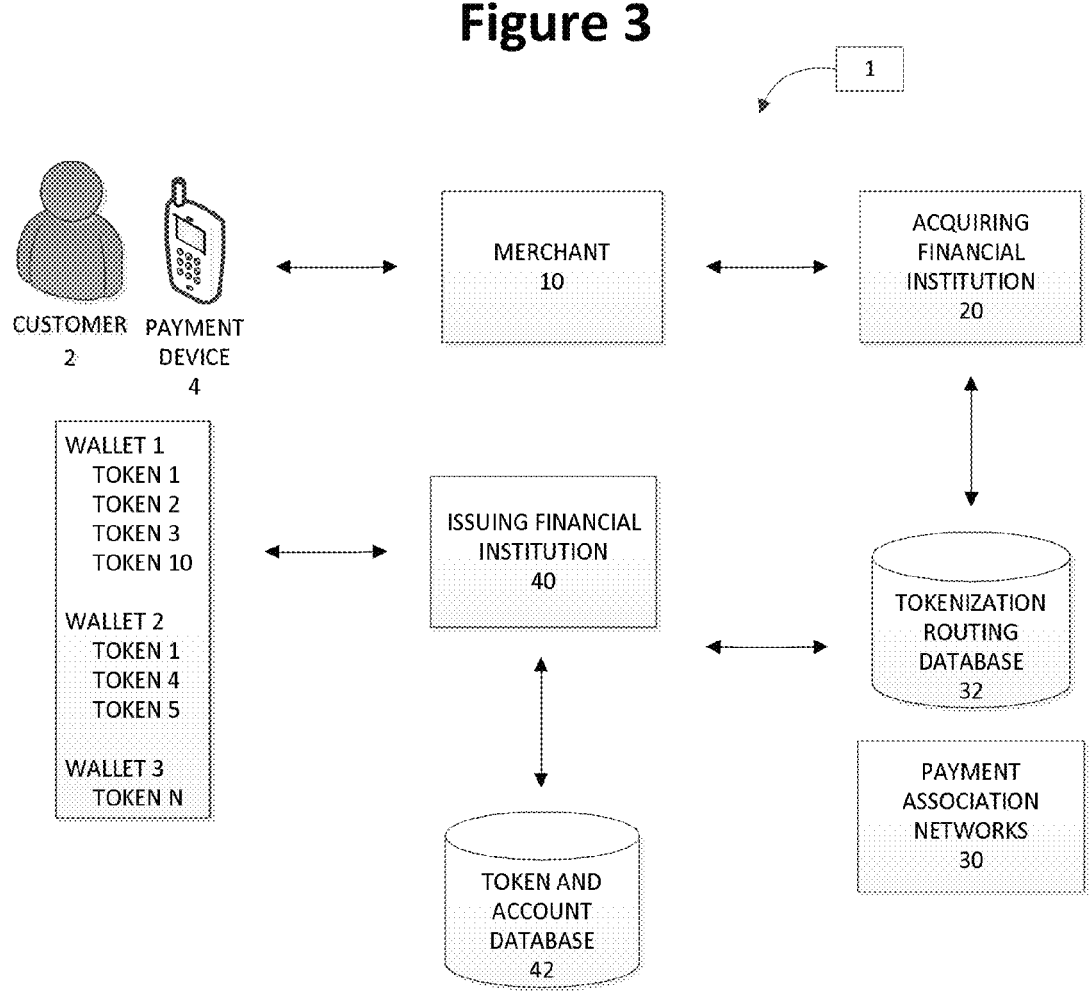
Figure 4:
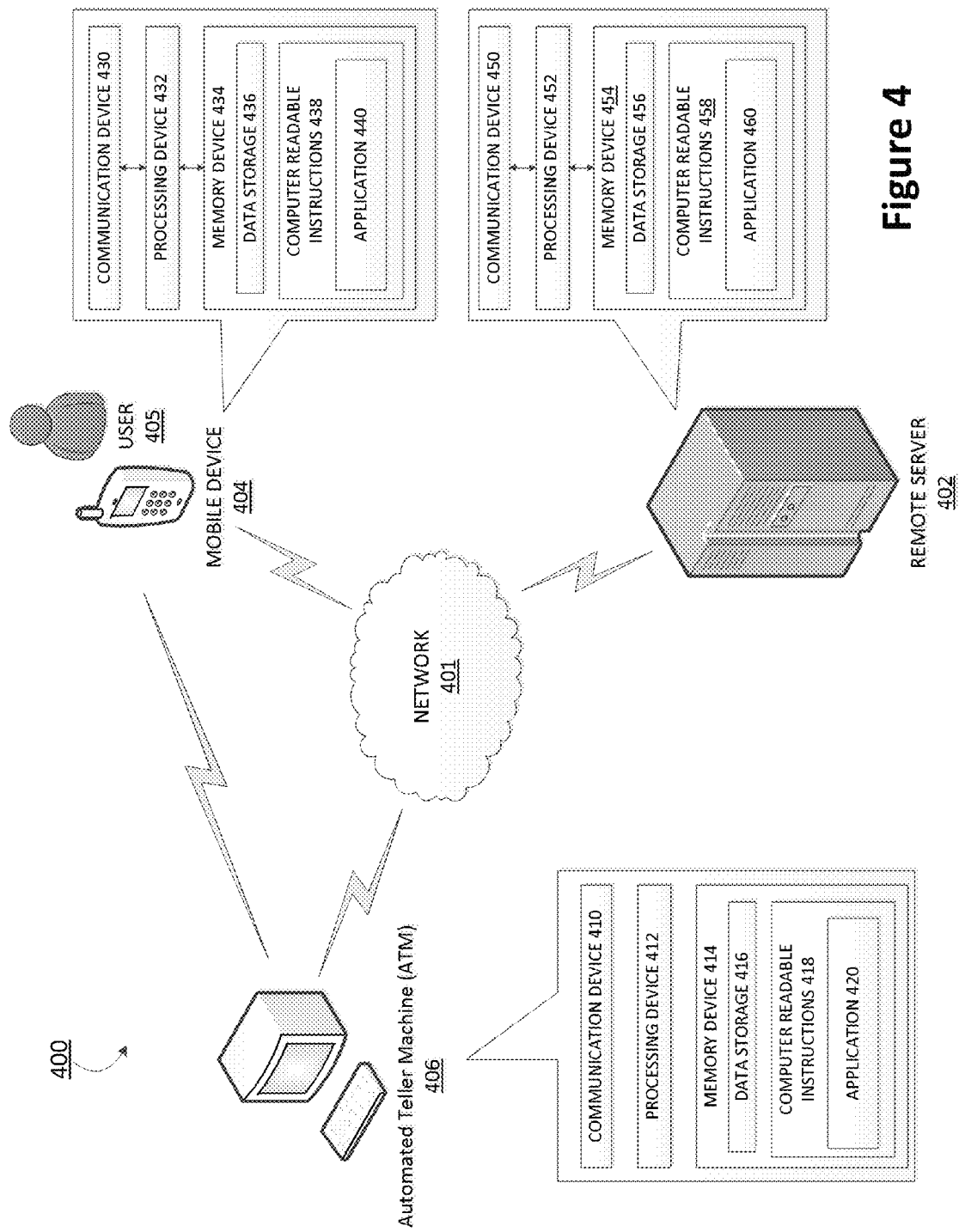
Figure 5:
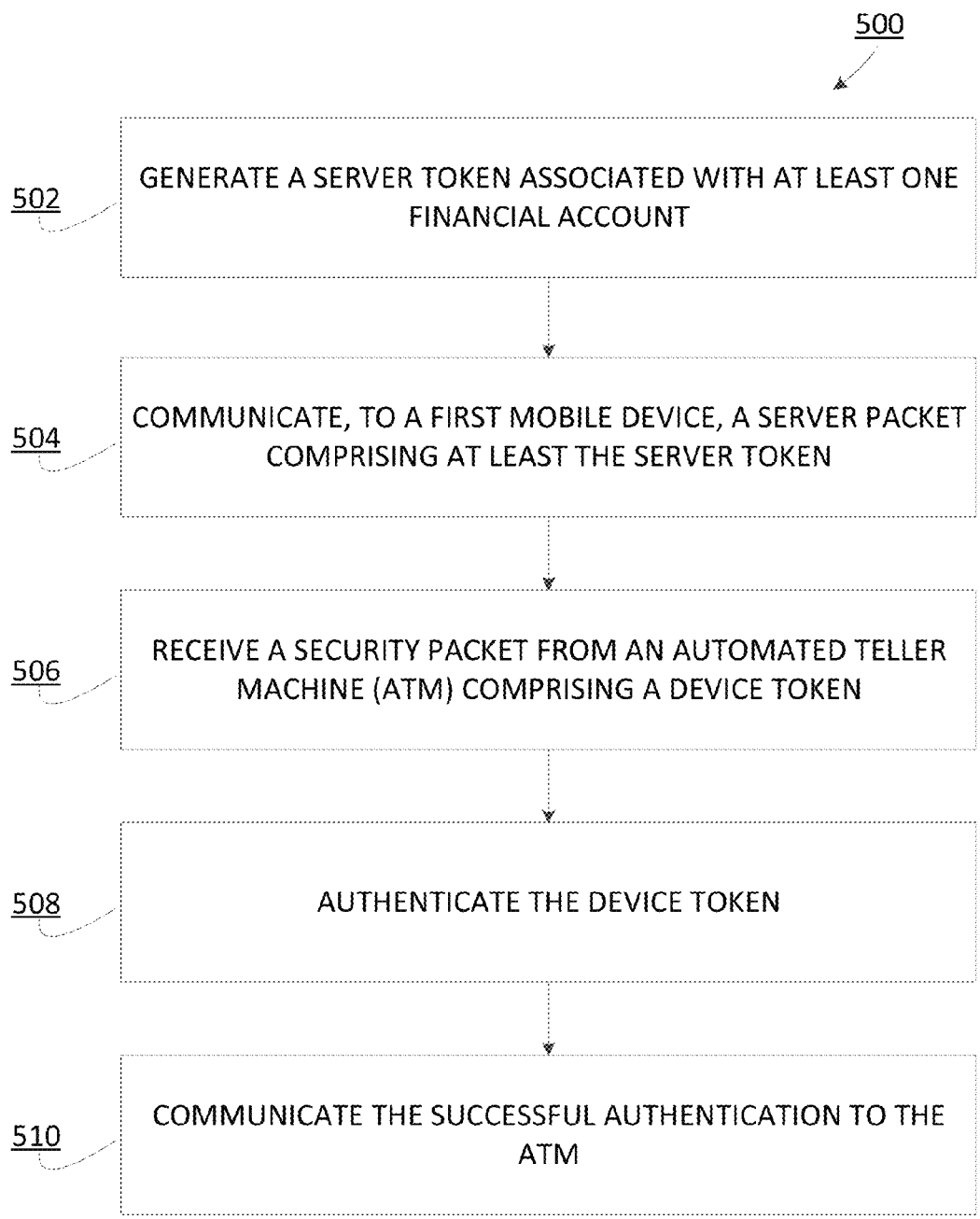
Figure 6:
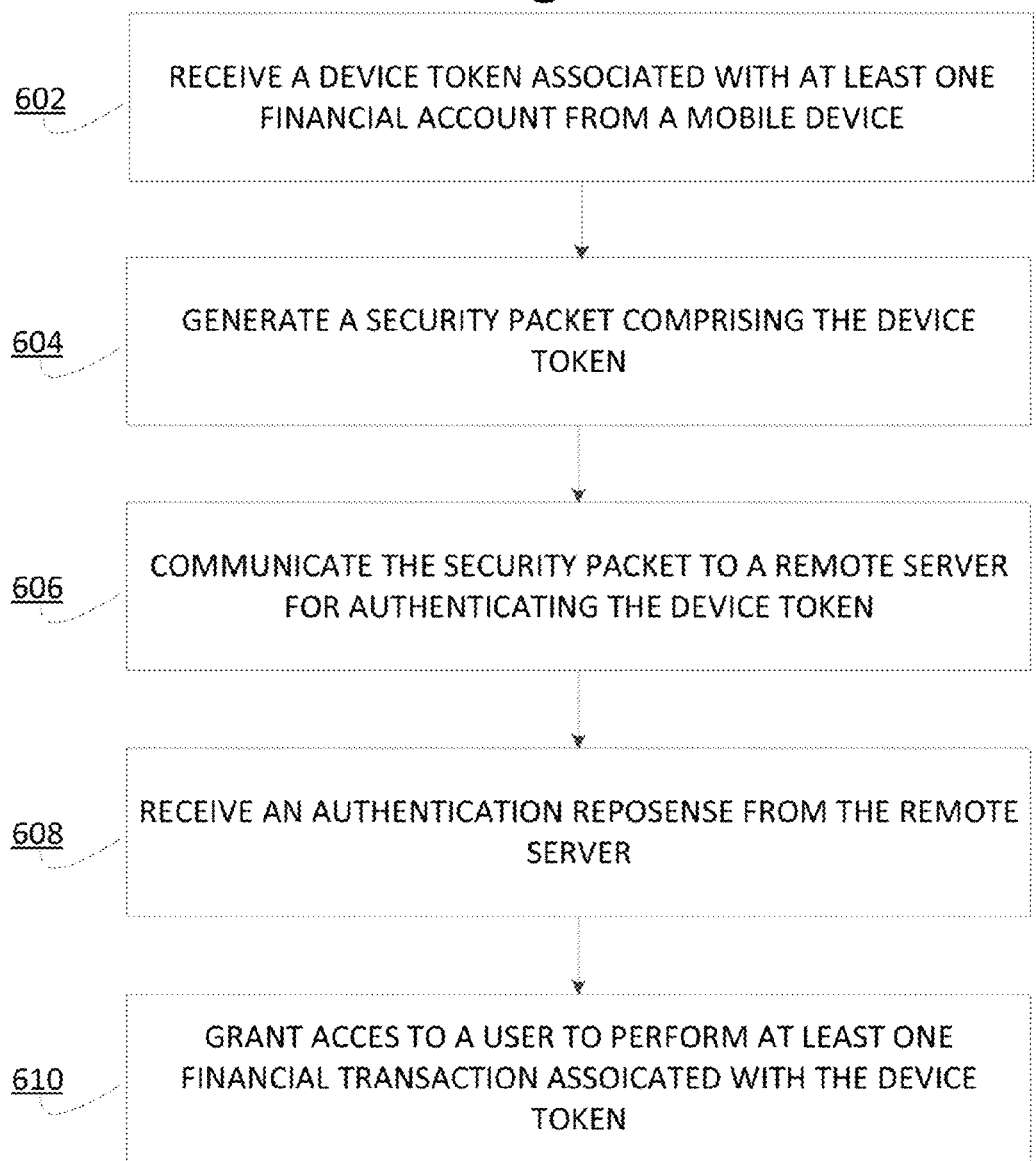
Figure 7:
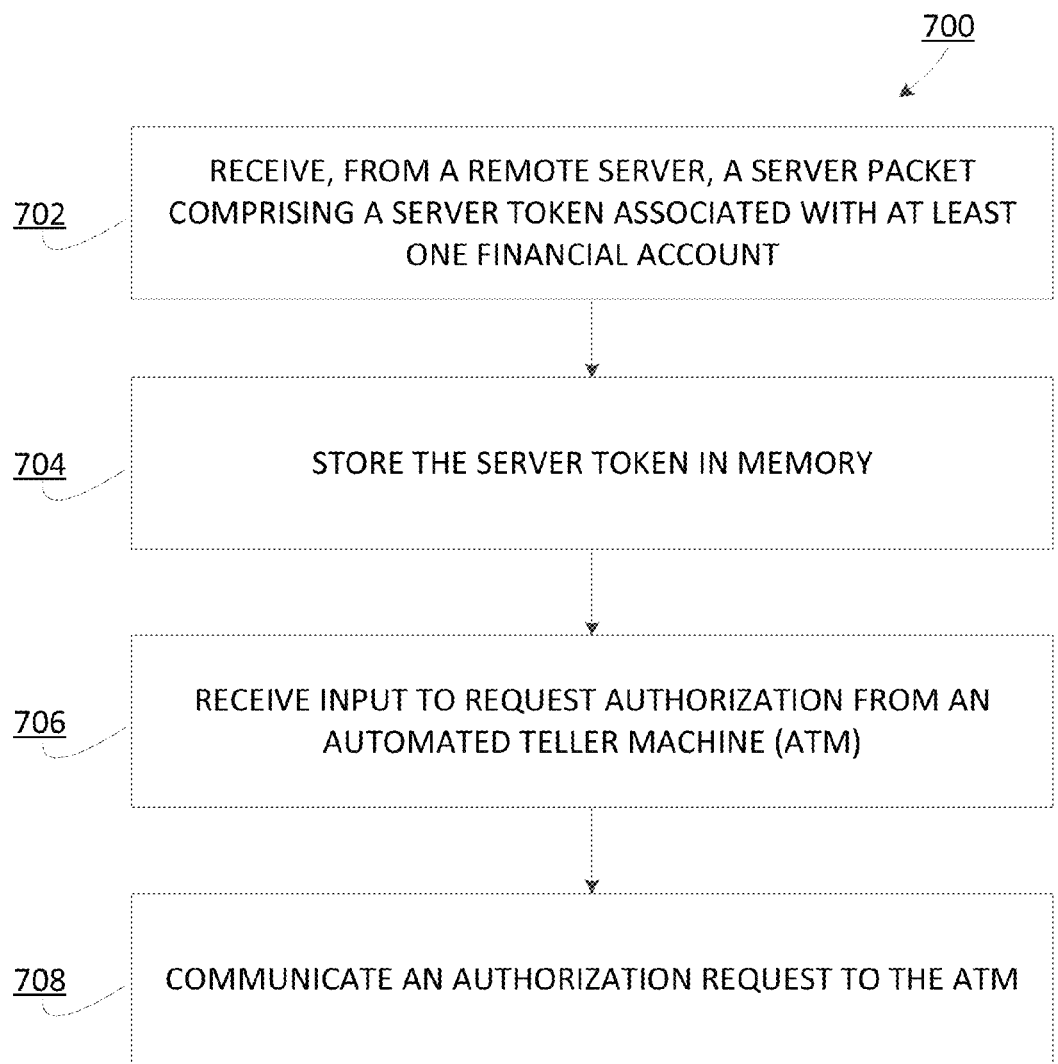

Having thus described embodiments of the invention in general terms, reference will not be made to the accompanying drawings, where:

FIG. 1 is a block diagram of a tokenization system according to the embodiments of the invention;

FIG. 2 is a block diagram of a tokenization system according to the embodiments of the invention;

FIG. 3 is a block diagram of a tokenization system according to the embodiments of the invention;

FIG. 4 is a block diagram of a system for allowing a user to conduct financial transactions on a financial account associated with a token;

FIG. 5 is a flow diagram of a method for managing financial tokens associated with a financial account;

FIG. 6 is a flow diagram of a method for allowing a user to conduct financial transactions on a financial account associated with a token using an ATM; and FIG. 7 is a flow diagram of a method for handling tokens associated with a financial account.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed the invention may be embodied in many different forms and should not be construed as limited to the embodiments set forth herein, rather, these embodiments are provided so that this disclosure may satisfy applicable legal requirements. Like numbers refer to like elements throughout.

In some embodiments, an "entity" as used herein may be a financial institution. For the purpose of this invention, a "financial institution" may be defined as an organization, entity, or the like in the business of moving, investing, or lending money, dealing in financial instruments, or providing financial services. This may include commercial banks, thrifts, federal and savings banks, savings and loan associations, credit unions, investment companies, insurance companies and the like. In some embodiments, and "entity" may not be a financial institution.

In some embodiments, a "mobile device" as used herein may be defined as any system wherein the system is capable of receiving, storing, and communicating a token as described herein. This may include but is not limited to a mobile phone, a tablet, a personal electronic device, an MP3 player, a key fob, and a credit card with an embedded communication device.

The present invention relates to tokenization, which is generally described in the area of financial transactions as utilizing a "token" (e.g., an alias, substitute, surrogate, or other like identifier) as a replacement for sensitive account information, and in particular account numbers. As such, tokens or portions of tokens may be used as a stand in for a user account number, user name, pin number, routing information related to the financial institution associated with the account, security code, or other like information relating to the user account. The one or more tokens may then be utilized as a payment instrument to complete a transaction. The one or more tokens may be associated with one or more payment devices directly or within one or more digital wallets associated with the payment devices. In other embodiments, the tokens may be associated with electronic transactions that are made over the Internet instead of using a physical payment device. Utilizing a token as a payment instrument instead of actual account information, and specifically an account number, improves security, and provides flexibility and convenience in controlling the transactions, controlling accounts used for the transactions, and sharing transactions between various users.

Tokens may be single-use instruments or multi-use instruments depending on the types of controls (e.g., limits) initiated for the token, and the transactions in which the token is used as a payment instrument. Single-use tokens may be utilized once, and thereafter disappear, are replaced, or are erased, while multi-use tokens may be utilized more than once before they disappear, are replaced, or are erased.

Tokens may be 16-digit numbers (e.g., like credit, debit, or other like account numbers), may be numbers that are less than 16-digits, or may contain a combination of numbers, symbols, letters, or the like, and be more than, less than, or equal to 16-characters. In some embodiments, the tokens may have to be 16-characters or less in order to be compatible with the standard processing systems between merchants, acquiring financial institutions (e.g., merchant financial institution), card association networks (e.g., card processing companies), issuing financial institutions (e.g., user financial institution), or the like, which are used to request authorization, and approve or deny transactions entered into between a merchant (e.g., a specific business or individual user) and a user. In other embodiments of the invention, the tokens may be other types of electronic information (e.g., pictures, codes, or the like) that could be used to enter into a transaction instead of, or in addition to, using a string of characters (e.g., numbered character strings, alphanumeric character strings, symbolic character strings, combinations thereof, or the like).

A user may have one or more digital wallets on the user's payment device. The digital wallets may be associated specifically with the user's financial institution, or in other embodiments may be associated with a specific merchant, group of merchants, or other third parties. The user may associate one or more user accounts (e.g., from the same institution or from multiple institutions) with the one or more digital wallets. In some embodiments, instead of the digital wallet storing the specific account number associated with the user account, the digital wallet may store a token or allow access to a token (e.g., provide a link or information that directs a system to a location of a token), in order to represent the specific account number during a transaction. In other embodiments of the invention, the digital wallet may store some or all of the user account information (e.g., account number, user name, pin number, or the like), including the user account number, but presents the one or more tokens instead of the user account information when entering into a transaction with a merchant. The merchant may be a business, a person that is selling a good or service (hereinafter "product"), or any other institution or individual with which the user is entering into a transaction.

The digital wallet may be utilized in a number of different ways. For example, the digital wallet may be a device digital wallet, a cloud digital wallet, an e-commerce digital wallet, or another type of digital wallet. In the case of a device digital wallet the tokens are actually stored on the payment device. When the device digital wallet is used in a transaction the token stored on the device is used to enter into the transaction with the merchant. With respect to a cloud digital wallet the device does not store the token, but instead the token is stored in the cloud of the provider of the digital wallet (or another third party). When the user enters into a transaction with a merchant, transaction information is collected and provided to the owner of the cloud to determine the token, and thus, how the transaction should be processed. In the case of an e-commerce digital wallet, a transaction is entered into over the Internet and not through a point of sale terminal. As was the case with the cloud digital wallet, when entering into a transaction with the merchant over the Internet the transaction information may be captured and transferred to the wallet provider (e.g., in some embodiments this may be the merchant or another third party that stores the token), and the transaction may be processed accordingly.

Specific tokens, in some embodiments, may be tied to a single user account, but in other embodiments, may be tied to multiple user accounts, as will be described throughout this application. In some embodiments a single tokens could represent multiple accounts, such that when entering into a transaction the user may select the token (or digital wallet associated with the token) and select one of the one or more accounts associated with the token in order to allocate the transaction to a specific account. In still other embodiments, after selection of the token by the user the system may determine the best account associated with the token to use during the transaction (e.g., most cash back, most rewards points, best discount, or the like). In addition, the tokens may be associated with a specific digital wallet or multiple digital wallets as desired by the institutions or users.

Moreover, the tokens themselves, or the user accounts, individual users, digital wallets, or the like associated with the tokens, may have limitations that limit the transactions that the users may enter into using the tokens. The limitations may include, limiting the transactions of the user to a single merchant, a group of multiple merchants, merchant categories, single products, a group a products, product categories, transaction amounts, transaction numbers, geographic locations, or other like limits as is described herein.

FIGS. 1 through 3 illustrate a number of different ways that the user 2 may use one or more tokens in order to enter into a transaction, as well as how the parties associated with the transaction may process the transaction. FIG. 1, illustrates one embodiment of a token system process 1, wherein the token system process 1 is used in association with a tokenization service 50. The tokenization service 50 may be provided by a third-party institution, the user's financial institution, or another institution involved in a transaction payment process. As illustrated in FIG. 1 (as well as in FIGS. 2 and 3), a user 2 may utilize a payment device 4 (or in other embodiments a payment instrument over the Internet) to enter into a transaction. FIG. 1 illustrates the payment device 4 as a mobile device, such as a smartphone, personal digital assistant, or other like mobile payment device. Other types of payment devices 4 may be used to make payments, such as but not limited to an electronic payment card, key fob, a wearable payment device (e.g., watch, glasses, or the like), or other like payment devices 4. As such, when using a payment device 4 the transaction may be made between the point of sale (POS) and the payment device 4 by scanning information from the payment device 4, using near field communication (NFC) between the POS and the payment device 4, using wireless communication between the POS and the payment device 4, or using another other type of communication between the POS and the payment device 4. When entering into an e-commerce transaction over the Internet, for example using the payment device 4 or another device without a POS, a payment instrument (e.g., a payment application that stores the token) may be used to enter into the transaction. The payment instrument may be the same as the token or digital wallet associated with the payment device 4, except they are not associated with specific payment device. For example, the token or digital wallet may be associated with a payment application that can be used regardless the device being used to enter into the transaction over the Internet.

The token can be associated directly with the payment device 4, or otherwise, through one or more digital wallets associated with the payment device 4. For example, the token may be stored on one or more payment devices 4 directly, and as such any transaction entered into by the user 2 with the one or more payment devices 4 may utilize the token. Alternatively, the payment device 4 may have one or more digital wallets stored on the payment device 4 that allow the user 2 to store one or more user account numbers, or tokens associated with the user account numbers, on the one or more digital wallets. The user may select a digital wallet or account within the digital wallet in order to enter into a transaction using a specific type of customer account. As such, the digital wallets may be associated with the user's issuing financial institutions 40, other financial institutions, merchants 10 with which the user enters into transactions, or a third party institutions that facilitates transactions between users 2 and merchants 10.

As illustrated in FIG. 1, a tokenization service 50 may be available for the user 2 to use during transactions. As such, before entering into a transaction, the user 2 may generate (e.g., create, request, or the like) a token in order to make a payment using the tokenization service 50, and in response the tokenization service 50 provides a token to the user and stores an association between the token and the user account number in a secure token and account database 52. The token may be stored in the user's payment device 4 (e.g., on the digital wallet) or stored on the cloud or other service through the tokenization service 50. The tokenization service 50 may also store limits (e.g., geographic limits, transaction amount limits, merchant limits, product limits, any other limit described herein, or the like) associated with the token that may limit the transactions in which the user 2 may enter. The limits may be placed on the token by the user 2, or another entity (e.g., client, administrator, person, company, or the like) responsible for the transactions entered into by the user 2 using the account associated with the token. The generation of the token may occur at the time of the transaction or well in advance of the transaction, as a one-time use token or multi-use token.

After or during creation of the token the user 2 enters into a transaction with a merchant 10 using the payment device 4 (or payment instrument over the Internet). In some embodiments the user 2 may use the payment device 4 by itself, or specifically select a digital wallet or user account stored within the digital wallet, to use in order to enter into the transaction. The token associated with payment device, digital wallet, or user account within the wallet is presented to the merchant 10 as payment in lieu of the actual user account number and/or other user account information. The merchant 10 receives the token, multiple tokens, and/or additional user account information for the transaction. The merchant 10 may or may not know that the token being presented for the transaction is a substitute for a user account number or other user account information. The merchant also captures transaction information (e.g., merchant, merchant location, transaction amount, product, or the like) related to the transaction in which the user 2 is entering with the merchant 10.

The merchant 10 submits the token (as well as any user account information not substituted by a token) and the transaction information for authorization along the normal processing channels (also described as processing rails), which are normally used to process a transaction made by the user 2 using a user account number. In one embodiment of the invention the acquiring financial institution 20, or any other institution used to process transactions from the merchant 10, receives the token, user account information, and transaction information from the merchant 10. The acquiring financial institution 20 identifies the token as being associated with a particular tokenization service 50 through the token itself or user account information associated with the token. For example, the identification of the tokenization service 50 may be made through a sub-set of characters associated with the token, a routing number associated with the token, other information associated with the token (e.g., tokenization service name), or the like. The acquiring financial institution 20 may communicate with the tokenization service 50 in order to determine the user account number associated with the token. The tokenization service 50 may receive the token and transaction data from the acquiring financial institution 20, and in response, provide the acquiring financial institution 20 the user account number associated with the token as well as other user information that may be needed to complete the transaction (e.g., user name, issuing financial institution routing number, user account number security codes, pin number, or the like). In other embodiments, if limits have been placed on the token, the tokenization service 50 may determine whether or not the transaction information meets the limits and either allows or denies the transaction (e.g., provides the user account number or fails to provide the user account number). The embodiment being described occurs when the token is actually stored on the payment device 4. In other embodiments, for example, when the actual token is stored in a cloud the payment device 4 may only store a link to the token or other token information that allows the merchant 10 or acquiring financial institution to acquire the token from a stored cloud location.

If the acquiring financial institution 20 receives the user account number from the tokenization service 50 (e.g., the tokenization service indicates that the transaction meets the limits), then the acquiring financial institution 20 thereafter sends the user account number, the other user information, and the transaction information directly to the issuing financial institution 40, or otherwise indirectly through the card association networks 30. The issuing financial institution 40 determines if the user 2 has the funds available to enter into the transaction, and if the transaction meets other limits on the user account, and responds with approval or denial of the transaction. The approval runs back through the processing channels until the acquiring financial institution 20 provides approval or denial of the transaction to the merchant 10 and the transaction between the merchant 10 and the user 2 is completed. After the transaction is completed the token may be deleted, erased, or the like if it is a single-use token, or stored for further use if it is a multi-use token.

Instead of the process described above, in which the acquiring financial institution 20 requests the token from the tokenization service 50, in some embodiments the tokenization service 50 may receive the transaction request and transaction information from the merchant 10 or acquiring financial institution 20. Instead of providing the account number to the acquiring financial institution 20, the tokenization service 50 may send the transaction request and transaction information to the issuing financial institution 40 directly, or indirectly through the payment association networks 30.

The embodiment illustrated in FIG. 1 prevents the user account number and other user information from being presented to the merchant 10; however, the tokenization service 50, acquiring financial institution 20, the card association networks 30, and the issuing financial institution 40 may all utilize the actual user account number and other user information to complete the transaction.

FIG. 2 illustrates another embodiment of a token system process 1, in which the user 2 may utilize a payment device 4 (or payment instrument over the Internet) to enter into transactions with merchants 10 utilizing tokens instead of user account numbers. As illustrated in FIG. 2, the user may have one or more tokens, which may be associated with the payment device 4, one or more digital wallets within the payment device 4, or one or more user accounts associated with the digital wallets. The one or more tokens may be stored in the user's payment device 4 (or on the digital wallet), or stored on a cloud or other service through the issuing financial institution 40 or another institution. The user 2 may set up the digital wallet by communicating with the issuing financial institution 40 (e.g., the user's financial institution) to request a token for the payment device, either for the device itself, or for one or more digital wallets or one or more user accounts stored on the payment device. As previously discussed, a wallet may be specifically associated with a particular merchant (e.g., received from the merchant 10) and include one or more tokens provided by the issuing financial institution 40 directly (or through the merchant as described with respect to FIG. 3). In other embodiments, the issuing financial institution 40 may create the digital wallet for the user 2 (e.g., through a wallet created for a business client or retail client associated with the user 2) and include one or more tokens for various types of transactions, products, or the like. The issuing financial institution 40 may store the tokens, the associated user account information (e.g., including the user account number), and any limits on the use of the tokens, as was previously described with respect to the tokenization service 50 in FIG. 1. In one embodiment the tokens may include user account information or routing information within the token or tied to the token, which allows the merchants 10 and other institutions in the payment processing systems to route the token and the transaction information to the proper institutions for processing. In other embodiments a tokenization routing database 32 may be utilized to determine where to route a transaction using a token, as described in further detail later.

The user 2 may enter into a transaction with the merchant 10 using a payment device 4 (or a payment instrument through the Internet). In one embodiment the user 2 may enter into the transaction with a token associated with the payment device 4 itself (or a payment instrument through the Internet). In other embodiments, a specific digital wallet and/or a specific account within the digital wallet may be selected for a particular merchant with whom the user 2 wants to enter into a transaction. For example, the user 2 may select "wallet 1" to enter into a transaction with "merchant 1" and "token 1" to utilize a specific account. The merchant 10 identifies the token, and sends the token and the transaction information to the acquiring financial institution 20. If the token has routing information the acquiring financial institution 20 may route the token and transaction data to the issuing financial institution 40 directly or through the card association networks 30. In situations where the token does not have associated routing information, the acquiring financial institution 20 may utilize a tokenization routing database 32 that stores tokens or groups of tokens and indicates to which issuing financial institutions 40 the tokens should be routed. One or more of the acquiring financial institutions 20, the card association networks 30, and/or the issuing financial institutions 40 may control the tokenization routing database in order to assign and manage routing instructions for tokenization across the payment processing industry. The tokenization routing database 32 may be populated with the tokens and the corresponding issuing financial institutions 40 to which transactions associated with the tokens should be routed. However, in some embodiments no customer account information would be stored in this tokenization routing database 32, only the instructions for routing particular tokens may be stored.

Once the token and transaction details are routed to the issuing financial institution 40, the issuing financial institution 20 determines the user account associated with the token through the use of the token account database 42. The financial institution determines if the funds are available in the user account for the transaction and if the transaction information meets other limits by comparing the transaction information with the limits associated with the token, the user account associated with the token or other limits described herein. If the transaction meets the limits associated with the token or user account, then the issuing financial institution 20 allows the transaction. If the transaction information does not meet one or more of the limits, then the issuing financial institution 20 denies the transaction. The issuing financial institution sends a notification of the approval or denial of the transaction back along the channels of the transaction processing system to the merchant 10, which either allows or denies the transaction.

The embodiment illustrated in FIG. 2 allows the user and the financial institution to shield the user's account number and other user information from all of the entities in the payment processing system because the merchant 10, acquiring merchant bank 20, payment association networks 30, or other institutions in the payment processing system only use the token and/or other shielded user information to process the transaction. Only the issuing financial institution 40 has the actual account number of the user 2.

FIG. 3 illustrates another embodiment of the token system process 1, in which the user 2 may utilize a payment device 4 (or payment instrument over the Internet) to enter into transactions with a merchant 10 utilizing a token instead of a user account number and/or other user account information. As illustrated in FIG. 3, the user 2 may have one or more tokens associated with the payment device 2, the one or more digital wallets, or one or more user accounts within the digital wallets. The one or more tokens may be stored in the user's payment device 4 (or within the digital wallet), or stored on a cloud or other service through the issuing financial institution 40 or another institution. The user 2 may set up the digital wallet by communicating with the issuing financial institution 40 (e.g., the user's financial institution) and/or the merchant 10 to request a token for the payment device 4, either for the payment device 4 itself, for the one or more digital wallets stored on the payment device 4, or for user accounts within the digital wallet. The financial institution 40 may have a dedicated group of tokens that are associated with a specific merchant, and as such the merchant 10 and the issuing financial institution 40 may communicate with each other to provide one or more tokens to the user 2 that may be specifically associated with the merchant 10. For example, the issuing financial institution may provide a set of tokens to "merchant 1" to associate with "wallet 1" that may be used by one or more users 2. As such "Token 10" may be associated with "wallet 1" and be specified only for use for transactions with "merchant 1."

The merchant 10 may provide the specific tokens from the financial institution 40 to the user 2, while the financial institution 40 may store the user account information with the token provided to the user 2. The financial institution may communicate directly with the user 2, or through the merchant 10 in some embodiments, in order to associate the token with the user 2. Since the merchant 10 provides, or is at least notified by the financial institution 40, that a specific token, or groups of tokens, are associated with a specific issuing financial institution 40, then the merchant 10 may associate routing information and transaction information with the token when the user 2 enters into a transaction with the merchant 10 using the token.

The merchant 10 passes the token (and potentially other user account information), routing information, and transaction information to the acquiring financial institution 20 using the traditional payment processing channels. The acquiring financial institution 20, in turn, passes the token (and potentially other user account information) and transaction information to the issuing financial institution 40 directly, or indirectly through the payment association networks 30 using the routing information. The issuing financial institution 40 accesses the token and account database 42 to identify the user account associated with the token and determines if the transaction information violates any limits associated with the token or the user account. The issuing financial institution 40 then either approves or denies the transaction and sends the approval or denial notification back through the payment processing system channels to the merchant 10, which then notifies the user 2 that the transaction is allowed or denied.

As is the case with the token system process 1 in FIG. 2, the token system process 1 in FIG. 3 allows the user 2 and the financial institution 40 to shield the user's account number and other user information from all of the entities in the payment processing system because the merchant 10, acquiring merchant bank 20, payment association networks 30, or other institutions in the payment processing system only use the token and/or other shielded user information to process the transaction. Only the issuing financial institution 40 has the actual account number of the user 2.

The embodiments of the invention illustrated in FIGS. 1 through 3 are only example embodiments of the invention, and as such it should be understood that combinations of these embodiments, or other embodiments not specifically described herein may be utilized in order to process transactions between a user 2 and merchant 10 using one or more tokens as a substitute for user account numbers or other user account information, such that the merchant 10, or other institutions in the payment processing system do not have access to the actual user accounts or account information.

As briefly discussed above, if the issuing financial institution 40 creates the digital wallet not only does the issuing financial institution 40 receive transaction information along the normal processing channels, but the financial institution 50 may also receive additional transaction information from the user 2 through the digital wallet using the application program interfaces (APIs) or other applications created for the digital wallet. For example, geographic location information of the user 2, dates and times, product information, merchant information, or any other information may be transmitted to the issuing financial institution 40 through the APIs or other applications to the extent that this information is not already provided through the normal transaction processing channels. This additional transaction information may assist in determining if the transactions meet or violate limits associated with the tokens, user accounts, digital wallets, or the like.

Alternatively, if the merchant 10 or another institution, other than the issuing financial institution 40, provides the digital wallet to the user 2, the issuing financial institution 40 may not receive all the transaction information from the traditional transaction processing channels or from the digital wallet. As such, the issuing financial institution 40 may have to receive additional transaction information from another application associated with the user 2 and compare the transaction information received through the traditional channels in order to associate the additional information with the transaction. In other embodiments, the issuing financial institutions 40 may have partnerships with the merchants 10 or other institutions to receive additional transaction information from the digital wallets provided by the merchants or other institutions when the users 2 enter into transactions using the digital wallets.

Moreover, when there is communication between the digital wallets of the users 2 and the issuing financial institution 40 or another institution, transactions in which the user 2 may enter may be pre-authorized (e.g., pre-qualified) to determine what accounts (e.g., tokens) may be used to complete the transaction, without having to arbitrarily choose an account for the transaction. In the case when there are multiple digital wallets or multiple accounts, the account that is pre-authorized or the account that provides the best rewards may be automatically chosen to complete the transactions.

As used herein, the term persistent storage shall be defined as the storage of digital information in a manner that is not destroyed or lost after the process by which the digital information was created terminates. Persistent storage may be achieved by using storage mediums such as hard drives, flash memory, CDs, DVDs, magnetic storage device, etc.

Additional embodiments of the invention will now be described in further detail in order to provide additional concepts and examples related to how tokens may be utilized in these illustrated token system processes 1 or in other token system processes not specifically described in FIGS. 1 through 3.

Additional embodiments of the invention will now be described in further detail in order to provide additional concepts and examples related to how tokens may be utilized in these illustrated token system 1 or in other systems not specifically described in FIGS. 1 through 3.

Referring to FIG. 4, a network environment is illustrated in accordance with embodiments of the present invention. As illustrated in FIG. 4, the remote server 402 is operatively coupled via a network 401 to the mobile device 404 and/or an automated teller machine (ATM) 406. In this configuration, the remote server 402 may send information to and receive information from the mobile device 404 and/or the ATM 406. Additionally, the mobile device 404 may send and receive communications directly from the ATM 406. FIG. 4 illustrates only one example of an embodiment of a network environment 400, and it will be appreciated that in other embodiments one or more of the systems, devices, or servers may be combined into a single system, device, or server, or be made up of multiple systems, devices, or server.

The network 401 may be a global area network (GAN), such as the Internet, a wide area network (WAN), a local area network (LAN), a telecommunication network or any other type of network or combination of networks. The network 401 may provide for wireline, wireless, or a combination wireline and wireless communication between devices on the network 401.

In some embodiments, the user 405 is an individual who maintains cellular products with one or more providers.

As illustrated in FIG. 4, the remote server 402 generally comprises a communication device 450, a processing device 452, and a memory device 454. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combination of the foregoing. Control and signal processing functions of the system are allocated between these processing devices according to their respective capabilities. The processing device may include functionality to operate one or more software programs based on computer readable instructions thereof, which may be stored in a memory device.

The processing device 452 is operatively coupled to the communication device 450 to communicate with the network 401 and other devices on the network 401. As such, the communication device 450 generally comprises a modem, server, or other device for communicating with other devices on the network 401.

As further illustrated in FIG. 4, the network remote server 402 comprises computer readable instructions 458 of an application 460. In some embodiments, the memory device, 454 includes data storage 456 for storing data related to and/or used by the application 460. The application 460 may perform generating, communicating, or authenticating or other actions related to a token by performing one or more of the steps and/or sub-steps discussed herein and/or one or more other steps not discussed herein.

As illustrated in FIG. 4, the mobile device 404 generally comprises a communication device 430, a processing device 432, and a memory device 434. The processing device 432 is operatively coupled to the communication device 430 and the memory device 434. In some embodiments, the processing device 432 may send or receive data from the mobile device 404, to the remote server 402 via the communication device 430 over a network 401. As such, the communication device 430 generally comprises a modem, server, or other device for communicating with other devices on the network 401.

As further illustrated in FIG. 4, the mobile device 404 comprises computer readable instructions 438 stored in the memory device 434, which in one embodiment includes the computer-readable instructions 438 of an application 440. In the embodiment illustrated in FIG. 4, the application 440 allows the mobile device 404 to be linked to the remote server 402 to communicate, via a network 401. The application 440 may be configured to receive, store in the data storage 436, and communicate tokens by performing one or more of the steps and/or sub-steps discussed herein.

As illustrated in FIG. 4, the ATM 406 generally comprises a communication device 410, a processing device 412, and a memory device 414. The processing device 412 is operatively coupled to the communication device 410 and the memory device 414. In some embodiments, the processing device 412 may send or receive data from the ATM to the remote server 402 via the communication device 410 over a network 401. As such, the communication device 410 generally comprises a modem, server, or other device for communication with other devices on the network 401.

As further illustrated in FIG. 4, the ATM 406, comprises computer-readable instructions 418 of an application 420. In the embodiment illustrated in FIG. 4, the application 420 allows the ATM 406 to be linked to the remote server 402 to communicate, via a network 401. The application 420 may receive and communicate tokens by performing one of more of the steps and/or sub-steps discussed herein.

It is understood that the servers, systems, and devices described herein illustrate one embodiment of the invention. It is further understood that one of more of the server, systems, and devices can be combined in other embodiments and still function in the same or similar way as the embodiments described herein.

Referring to FIG. 5, a flow diagram illustrates a method 500 for authenticating a user at an ATM using a token. The method may include generating a server token, and granting access to a user based at least in part on the authentication of the server token. For instance, at block 502, the method 500 includes generating a server token associated with at least one financial account.

In some embodiments, the system may also generate a server personal identification number (PIN) and associate the server PIN with the server token. In some embodiments, the system may access customer-related data such as customer PIN(s) in order to generate the server PIN. Similarly, the system may retrieve a customer number associated with a customer and generate the server PIN based at least in part on the customer number. For example, a user may have an account with a financial institution and the financial institution may require the user to generate a user PIN in order to conduct financial transactions associated with the account. If a token is generated by a system for the user to conduct at least one financial transaction associated with the account, after the manner described herein, the system could, in some embodiments, retrieve the user PIN and create the server PIN based on the user PIN.

In another embodiment of the invention, when generating the server PIN, the system may be configured to create a random PIN. Once the random PIN is created, the system may then use the random PIN as the server PIN or use the random PIN as an input to creating the server PIN.

At block 504, the method 500 includes communicating a server packet to a first mobile device, wherein the server packet comprises at least the server token. In some embodiments, communicating the server packet to the mobile device may be accomplished using a network.

In another embodiment, the system may communicate the security packet to the mobile device using a near field communication (NFC) transmitter. For example, if the mobile device was a programmable key fob and the system further comprises a NFC transmitter capable of programming the key fob, the system would communicate the server token by programming the key fob.

In some embodiments, the system is configured to generate a server PIN, the system may be configured to include the server PIN in the server packet before communicating the server packet to the first mobile device. As discussed below, the server PIN may be used as part of an authentication process in order to grant authorization to the user for conduction a financial transaction on a financial account associated with the token.

At block 506, the method 500 includes receiving a security packet from an ATM comprising a device token. In some embodiments, the security packet it typically transferred from the ATM to the system via a network connection.

In some embodiments, as discussed above, where the system has been configured to generate and communicate a server PIN, the security packet may also contain a device PIN.

In some embodiments of the invention, the device token is communicated to the ATM from a second mobile device. In some embodiments, the first mobile device and the second mobile device are the same. The second mobile device may be configured to encrypt the token prior to communicating the device token to the ATM. In addition, the second mobile device may be further configured to encrypt the device token with a changeable encryption, wherein the second mobile device uses an algorithm that encrypts the token based on a time period in which the second mobile device communicates the device token to the ATM. For example, a second mobile device may contain a token and a user desires to perform a financial transaction on an account associated with the token on an ATM. Prior to the second mobile device communicating the token to the ATM, the device will encrypt the token based at least on part of the current time. In addition to sending the device token, the mobile device will send the time in which the communication took place. The ATM will include the time in which the communication took place in the security packet. If the user uses the token again to perform a subsequent financial transaction, the mobile device may once again encrypt the token based upon the new current time.

At block 508, the method 500 includes authenticating the device token. In some cases, authentication includes comparing the device token with the server token. When the ATM communicates the server packet to the system, the device token may be encrypted. Where the device token is not encrypted, the system will perform an authentication on the device token as received in the security packet and compare it against the stored server token. Alternatively, where the device token is encrypted, the system may decrypt the device token prior to comparing the system and the device token. Further, either the mobile device or the ATM may encrypt the token using to form a digest. Digests, by design, cannot be decrypted. Therefore, if a third party were to gain access to the digest, the third party would be unable to decrypt the digest to gain the original token. This type of encryption is useful when the original token is stored by the authenticating system and the digest does not need to be recovered. When the system receives the token, the system performs an authentication on the digest by encrypting the server token to form a second digest and comparing the first digest and the second digest.

In other embodiments, where the second mobile device encrypts the device token using an algorithm based at least in part on time, the system may be configured to perform an encryption of the server token using the communication time located in the security packet and using the same or a related or similar algorithm that the mobile device used to encrypt the device token. After the device token has been encrypted, the system may be configured to perform a comparison of the device token and the server token. By the system using this type of encryption, if an third party were to gain access to the device, the person would not be able to perform a financial transaction associated on the financial account associated with the token because the person would be missing the algorithm necessary to encrypt the device token. Additionally, if the person were to gain access to an encrypted device token, the person would again not be able to perform a financial transaction with the device token because the system would use the time in which the encrypted token is communicated to encrypt the system token. The authentication would not pass because the encrypted system token and the device token would not match. Therefore, in order for the system to properly compare the device token and the server token, the system and the second mobile device must: 1) utilize a similar encryption algorithm based at least in part upon the time in which the device token is communicated; 2) have a valid device token; and 3) encrypt the tokens using a key that is based at least upon the same time.

In some embodiments, the server may be configured to associate the server token with at least one authorized ATM, as identified by a list of identification markers accessible by the system. A user desiring to perform a financial transaction on an account associated on an ATM, may only perform the transaction on one of the at least one authorized ATMs. When the ATM communicates the security packet to the system, the ATM may include an ATM identification marker in the security packet. The system would compare the ATM identification marker against the list of stored ATM identification markers and determine if the ATM is authorized for use. If the ATM identification marker is not among the listed identification markers, the system may reject the request. For example, if a mobile device contains a token and a user of the mobile device communicates the token to an ATM that is not an authorized ATM, the ATM will either not send an identification marker or send an non-authorized identification marker in the security packet to the system. In either case, the system would prevent authentication based on the system not being able to properly compare the missing or the non-authorized identification marker with the authorized ATMs.

In yet other embodiments, when the second mobile device communicates the device token to the ATM, the mobile device may also communicate a device identification marker. The ATM may include the device identification marker in the security packet communicated to the server. Additionally, the authentication may further comprise comparing the device identification marker against a known identification marker. Therefore, if a valid device identification marker is not sent, the system may be configured not to provide proper authentication. Additionally, if the device identification marker does not match the known identification marker, the authentication could fail. For example, a system may generate a system token and communicate the system token to a first mobile device. The system may have recorded an identification marker for the first mobile device. If an unauthorized person were to gain access to the token and communicate the token from a second mobile device to the ATM, the mobile device would send a unique identification marker for the second mobile device or not send an identification marker at all. In either case, the system would prevent authentication based on the system not being able to properly compare the identification marker from the second mobile device and the recorded identification.

In other embodiments of the invention, the system may be configured to disable a server token after its associated device token has been properly authenticated. By disabling a server token after authentication of the associated device token, if the device token is received a second time, the system will not authenticate the device token again. This ensures that server tokens can only be used one time.

In other embodiments, the system may be configured to disable a server token if the server token has not been used within a predetermined period of time. Therefore, after the server token has been disabled, if the system receives a device token that is associated with the server token, the system may not authenticate the device token.

In other embodiments, in order to authenticate the token, the system may send a request to the mobile device over a network. The request to the mobile device would require global position information of the mobile device. The system would receive a response from the mobile device containing the global position information. In various embodiments, the system could have information stored in memory of the global position of the ATM being used by the user to conduct a financial transaction. In other embodiments, the ATM could send information regarding its global position as part of the security packet. The system would take the ATM global position information and compare it against the mobile device global position information and determine whether the mobile device is within a pre-determined radius of the ATM. The authentication could therefore be based in part upon the distance of the mobile device from the ATM.

At block 512, the method 500 includes communicating the successful authentication to the ATM. In some embodiments, if the system properly authenticates the device, the serve would communicate the authentication back to the ATM using a standard message. Such a message may be in the form of a status code, a human readable message, or a block of code describing the details of the authentication. The system could also send back a standard message when the authentication fails.

In some embodiments, the system could communicate the successful authentication via a network that provides communication between the system and the ATM.

Referring to FIG. 6, a flow diagram illustrates a method 600 for an apparatus to receive a request to perform a transaction on a financial account associated with a device token and grant access to the request based at least in part on the successful authentication of the device token.

In some embodiments, the apparatus may be an Automated Teller Machine (ATM). The ATM may be associated with a financial institution or may be operated by a third party.

At block 602, the method 600 includes receiving, from a mobile device, an authorization request, wherein the authorization request comprises at least a device token associated with at least one financial account. In some embodiments of the invention, the apparatus may contain an NFC transmitter and the mobile device may contain an NFC transmitter. In such cases, the apparatus may be configured to receive the authorization request from the mobile device via the NFC transmitters.

In some embodiments, the apparatus may be further configured to request a user submitted PIN from a user. In such a case, the apparatus would also receive the user submitted pin. The apparatus may further comprise a keypad and the apparatus may be further configured to request the user to enter a PIN using the keypad.

In other embodiments, the mobile device may be configured to allow a user to enter in the user submitted PIN using a keypad or a touch screen located on the mobile device. In such a case, the mobile device would include the user submitted PIN in the authorization request and the apparatus receives the user submitted PIN when it receives the authorization request and extracts the user submitted PIN from the authorization request.

At block 604, the method 600 includes generating a security packet comprising at least the device token received from the mobile device. As discussed above, where the authorization request contains an identification marker for the mobile device, the apparatus may be further configured to include the identification marker for the mobile device in the security packet. In yet other embodiments, the apparatus may be further configured to include an identification marker for the apparatus in the security packet.

In some embodiments, the apparatus may be further configured to encrypt the security packet prior to communicating the security packet to the server. By allowing the apparatus to encrypt the security packet prior to communicating the security packet to the server, if the security packet were to be intercepted by a third party, the third party would not be able to gain access to any portion of the security packet, including the server token.

As discussed above, the apparatus may also include information about its global position in the security packet in order to authenticate the device token. Such information would be compared against information collected from the mobile device by the server directly over a network.

At block 606, the method 600 includes communicating the security packet to a remote server for authenticating the device token. In some embodiments, the apparatus communicates the security packet to the remote server via a network.

At block 608, the method 600 includes receiving an authentication response from the remote server. In some embodiments, the apparatus receives the authentication response form the remote server via a network.

At block 610, the method 600 includes granting access to a user to perform at least one transaction on a financial account associated with the device token. The at least one transaction may include at least making a cash withdrawal from the account associated with the device token, transferring money between two accounts associated with the device token, viewing the balance of an account associated with the device token, and making a deposit into an account associated with the device token.

Referring to FIG. 7, a flow diagram illustrates a method 700 for making a request from a device to an ATM in order to perform a transaction on a financial account associated with a server token.

At block 702, the method 700 includes receiving, from a remote server, a server packet comprising at least a server token associated with at least one financial account. In some embodiments of the invention, a means for receiving the packet from the remote server could be a network. In other embodiments, the device could further comprise a NFC transmitter and the remote server could further comprise an NFC transmitter. The device could be configured to receive the server packet via using a link between the device NFC transmitter and the remote server NFC transmitter.

At block 704, the method 700 includes storing the server token in memory. In some embodiments, the device may be configured to store the server token permanently. In other embodiments, the device may be configured to delete after a predetermined period of time.

In other embodiments of the invention, the device may be configured to store multiple server tokens. In yet other embodiments, the device may be configured to store only one server token at a time. In instances where the device in configured to store only one server token at a time, the device may be configured to erase an old server token when a new server token is received by the device.

At block 706, the method 700 includes receiving input from a user in order to request authorization from an ATM to perform the transaction on the financial account associated with the server token. In some embodiments of the invention, receiving input from a user may be the result of linking the device with the ATM. Where the device contains a NFC transmitter and the ATM further comprises an NFC transmitter, the device and the ATM may be configured to establish a link. One manner in which a link may be established between the device and the ATM is by a user placing the NFC transmitter on the device next to the NFC transmitter on the ATM. The device, via the device NFC transmitter, will send a pairing request to the ATM. The ATM will receive the pairing request and send, via the ATM NFC transmitter, a pairing response to the device, thereby resulting in a successful pairing between the device and the ATM and additionally resulting in a user input to submit a request to perform a transaction on a financial account associated with the server token.

In other embodiments of the invention, the device may contain a means by which the user may send a signal to the device in order to make the request. For example, the device may contain a button, wherein if the user presses the button, the user has successfully made the request. In another example, the device may contain a touch screen and be configured to display an option to make the request, whereupon the user selecting the option, the user makes the request.

In yet other embodiments of the invention, where the device is configured to store more than one device token, the device may be configured to display a list of available server tokens to the user, whereupon the user may select one of the device tokens. Upon selecting one of the device tokens, the user has successfully made the request.

At block 708, the method 700 includes communicating an authorization request the ATM. In some embodiments of the invention, where the device contains an NFC transmitter and the ATM contains an NFC transmitter, the device may communicate, via the NFC transmitters, the authorization request to the ATM. Additionally, the communication of the authorization request may occur after a successful pairing between the device and the ATM.

In some embodiments of the invention, the device may be configured to request from the user a user submitted PIN after the input is received from the user to make an authorization request from the ATM. The device could be further configured to include the user submitted PIN in the authorization request sent by the device to the ATM.

In some embodiments of the invention, the device may be configured to encrypt the authorization request prior to communicating the authorization request to the ATM. The device may also be configured to encrypt the server token prior to including it in the authorization request and communicating the authorization request to the ATM. In yet other embodiments, the device could be configured to encrypt the server token using a time based algorithm wherein the server token is encrypted based at least in part on the time which the authorization request is communicated the ATM. Where the server token is encrypted based at least in part on the time based algorithm, the device may include the time which the authorization request is communicated to the ATM in the authorization request.

In other embodiments, the device may be configured to include a device identification marker in the authorization request. In yet other embodiments, where the device is configured to store more than one device token and after a user selected a given device token, the device could be configured to communicate said device token to the ATM.

As discussed above, in some embodiments, the mobile device may comprise a means for determining its global position. Where the token management system is configured to request, from the mobile device, a global position via a network, the mobile device could be configured to make a response using the required information back to the server via the same network, Such information would allow the system to properly authenticate that the mobile device is within a pre-determined distance form ATM from which the user is requesting to conduct a financial transaction.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

In some embodiment, the system may require different levels of authentication prior to granting access to a user to perform financial transactions on an account associated with a token. Additionally, different financial transactions may be associated with different levels of authentication. For example, a user may request access to view funds available of a financial account associated with a token. For such a transaction, the system may require only the token. However, if the user requests to withdraw funds from the same account, the user may also be required to enter a PIN.

In various embodiments, the mobile device may be configured to require authentication prior to a user communicating a token to an ATM. The authentication may be based in part on user input. Such input may be the mobile device requiring the user to input a PIN, a password, or scan biometric data. The level of user authentication may also be based in part on validating an identity of the mobile device of the user. Such verification can be incorporated into a close network score or into a unique identity score that is combined with the close network score in order to determine the appropriate level of authentication required for a requested action/function. The identity of the mobile device may be determined in a variety of ways. For example, a particular mobile device may be identified by gathering device identification information from the mobile device to generate the device's "fingerprint," or unique signature of the mobile device. Device identification information may be collected from a variety of sources. In some embodiments, the device identification information includes an identification code. The identification code may be but is not limited to a serial number or an item number of the device. In some embodiments, the device identification information may be associated with a chip associated with the mobile device. The chip may be but is not limited to a subscriber identification module (SIM) card, removable hard drive, processor, microprocessor, or the like. In other embodiments, the device identification information may be associated with a removable part of the mobile device. Removable parts include but are not limited to detachable keyboards, battery covers, cases, hardware accessories, or the like. Removable parts may contain serial numbers or part numbers. In alternative embodiments, a unique key, code, or piece of software provided by a financial institution may be downloaded onto the mobile device. This unique key, code, or piece of software may then serve as device identification information. Typically, the device identification information (e.g., a serial number, an identification code, an International Mobile Station Equipment Identity (IMEI), a phone number, a chip, a removable part, or similar pieces of device identification information) is collected from the mobile device without requiring user input. For example, the device identification information may be automatically provided by the mobile device. Alternatively, the mobile device may provide the information without requiring user input after receiving a request from a system for the identification information. In other embodiments, device identification information may be entered manually at the mobile device. For example, if the mobile device's serial number cannot be automatically located (perhaps due to interference, long range, or similar hindrance), the user may be prompted for manual entry of the serial number (or an identification code, an International Mobile Station Equipment Identity (IMEI), a phone number, a chip, a removable part, or similar pieces of device identification information). The device identification information may be stored and subsequently used to identify the mobile device.

In addition to providing authentication of the token itself, the system may, in some embodiments, be configured to provide limits on transactions performed by a user using the ATM. When a user performs a transaction, the ATM could send information to the system regarding the transaction. The information could be compiled into a transaction packet and could include information regarding the type of transaction, an amount of money associated with the transaction, a timestamp associated with the transaction, etc. These pieces of information are herein defined as limits. The system could be configured to allow the transaction based at least in part on these limits. The system could be configured a transaction to meet a set of limits, known as filters, prior to the system authenticating the transaction.

While the system has been described as determining whether the transaction meets the limits and either allowing or denying a transaction based on that determination, in some embodiments the filters may also be responsive to transaction information. For example, exceptions to the filters may allow a transaction even if the filter is not met. In an embodiment, the system evaluates the transaction information to determine: (1) does the transaction meet the limits; and (2) if the transaction does not meet the limits, does the transaction qualify for an exception to the limits. If the system determines that a positive response to either query, then transaction may be allowed.

In some embodiments, the exceptions are based at least in part upon the transaction information. For example the system may determine that a user is using an ATM to withdraw money from an account associated with a financial token. The ATM could send information to the system using a transaction packet regarding the amount of money the user desires to withdraw. The system could have a filter wherein a limit is placed on the amount of money the user may withdraw in a single day. If the amount of money exceeds the total amount available to withdraw within the day, the system could be configured to deny the transactions. However, the system could also be configured to provide an exception to the daily withdrawal limit. For example, the limit may be lifted if the user makes a withdrawal from an ATM located with a certain geographical area or is managed by a particular financial institution.

The transaction-responsive limits are designed to provide flexibility to the system and better serve the user. The transaction-responsive limits may be tailored to the user or generic to the token and/or system. By providing for transaction-responsive limits, the system allows transactions that would otherwise be denied based on binary yes/no limits when the transaction information indicates the appropriateness of the transaction.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

To supplement the present disclosure, this application further incorporates entirely by reference the following commonly assigned patent applications:

| U.S. patent application Ser. No. | Title | Filed On |
|---|---|---|
| 14/196,816 (published as U.S. patent App. Pub. No. 2015/0254648) | MANAGED DIGITAL WALLETS | Mar. 4, 2014 |
| 14/196,798 (published as U.S. patent App. Pub. No. 2015/0254664) | TOKEN COLLABORATION NETWORK | Mar. 4, 2014 |
| 14/196,802 (published as U.S. patent App. Pub. No. 2015/0254653) | FORMATION AND FUNDING OF A SHARED TOKEN | Mar. 4, 2014 |
| 14/196,364 (published as U.S. patent App. Pub. No. 2015/0254657) | LIMITING TOKEN COLLABORATION NETWORK USAGE BY USER | Mar. 4, 2014 |
| 14/196,373 (published as U.S. patent App. Pub. No. 2015/0254658) | LIMITING TOKEN COLLABORATION NETWORK USAGE BY TOKEN | Mar. 4, 2014 |
| 14/196,809 (published as U.S. patent App. Pub. No. 2015/0254635) | LIMITING THE USE OF A TOKEN BASED ON A USER LOCATION | Mar. 4, 2014 |
| 14/196,813 (published as U.S. patent App. Pub. No. 2015/0254665) | AUTHORIZING A TEMPORARY TOKEN FOR A USER | Mar. 4, 2014 |
| 14/196,030 (published as U.S. patent App. Pub. No. 2015/0254650) | CONTROLLING TOKEN ISSUANCE BASED ON EXPOSURE | Mar. 4, 2014 |
| 14/196,292 (published as U.S. patent App. Pub. No. 2015/0254647) | FLEXIBLE FUNDING ACCOUNT TOKEN ASSOCIATIONS | Mar. 4, 2014 |
| 14/196,350 (published as U.S. patent App. Pub. No. 2015/0254656) | ACCOUNT TOKEN ASSOCIATIONS BASED ON SPENDING THRESHOLDS | Mar. 4, 2014 |
| 14/196,383 (now issued as U.S. Pat. No. 9,424,572) | ONLINE BANKING DIGITAL WALLET MANAGEMENT | Mar. 4, 2014 |
| 14/196,653 (now issued as U.S. Pat. No. 9,406,065) | CUSTOMER TOKEN PREFERENCES INTERFACE | Mar. 4, 2014 |
| 14/196,752 (published as U.S. patent App. Pub. No. 2015/0254644) | CREDENTIAL PAYMENT OBLIGATION VISIBILITY | Mar. 4, 2014 |
| 14/196,919 (published as U.S. patent App. Pub. No. 2015/0254645) | PROVIDING SUPPLEMENTAL ACCOUNT INFORMATION IN DIGITAL WALLETS | Mar. 4, 2014 |
| 14/196,894 (published as U.S. patent App. Pub. No. 2015/0254699) | PROVIDING OFFERS ASSOCIATED WITH PAYMENT CREDENTIALS IN DIGITAL WALLETS | Mar. 4, 2014 |
| 14/196,869 (published as U.S. patent App. Pub. No. 2015/0254698) | PROVIDING OFFERS ASSOCIATED WITH PAYMENT CREDENTIALS AUTHENTICATED IN A SPECIFIC DIGITAL WALLET | Mar. 4, 2014 |
| 14/196,257 (now issued as U.S. Pat. No. 9,600,817) | FOREIGN EXCHANGE TOKEN | Mar. 4, 2014 |
| 14/196,274 (now issued as U.S. Pat. No. 9,600,844) | FOREIGN CROSS-ISSUED TOKEN | Mar. 4, 2014 |
| 14/196,545 (published as U.S. patent App. Pub. No. 2015/0254642) | DIGITAL WALLET EXPOSURE REDUCTION | Mar. 4, 2014 |
| 14/196,460 (published as U.S. patent App. Pub. No. 2015/0254641) | MOBILE DEVICE CREDENTIAL EXPOSURE REDUCTION | Mar. 4, 2014 |
| 14/196,034 (published as U.S. patent App. Pub. No. 2015/0254646) | RESTORING OR REISSUING OF A TOKEN BASED ON USER AUTHENTICATION | Mar. 4, 2014 |
| 14/196,405 (published as U.S. patent App. Pub. No. 2015/0254663) | TOKEN USAGE SCALING BASED ON DETERMINED LEVEL OF EXPOSURE | Mar. 4, 2014 |

What is claimed is:

1. A system for managing financial tokens associated with a financial account, whereby the system generates and authenticates tokens associated with the financial account in order to grant access to a user to conduct financial transactions on the financial account using an Automated Teller Machine (ATM) via a mobile device, the system comprising:
- an Automated Teller Machine (ATM) with a first Near Field Communication (NFC) transmitter;
- a memory;
- a computing processor; and
- a module stored in the memory, the module comprising instruction code executable by one or more computing processors, and configured to cause the one or more computing processors to:
  - generate a server token, wherein the server token is associated with at least one financial account;
  - encrypt the server token using an encryption algorithm, wherein the server token is encrypted at least in part based on time;
  - communicate, to a first mobile device, a server packet, wherein the server packet comprises at least the encrypted server token, wherein the first mobile device has paired with the ATM via a second Near Field Communication (NFC) transmitter on the first mobile device and the first NFC transmitter of the ATM;
  - receive, from the ATM, a security packet, wherein the security packet comprises at least a device token communicated from the first mobile device to the ATM and an identification marker of the ATM;
  - wherein the device token is encrypted at least in part based on time,
  - wherein the device token is encrypted using the encryption algorithm used to encrypt the server token;
  - determine that the ATM is authorized for use, wherein determining that the ATM is authorized for use comprises comparing the received identification marker of the ATM with a list of identification markers accessible by the system;
  - upon determining that the ATM is authorized for use, authenticate the device token, the authentication comprising comparing the device token with the server token, thereby resulting in a successful authentication of the device token; and
  - communicate the successful authentication to the ATM.

2. The system of claim 1, wherein, the system is further configured to:
- generate a server personal identification number (PIN), wherein the server PIN is a sequence of characters; and
- associate the server PIN with the server token;
- wherein, the server packet further comprises the server PIN, wherein the server PIN comprises a sequence of characters;
- wherein, the security packet further comprises a user inputted PIN; and
- wherein, authenticating the device token further comprises comparing the server PIN with the user submitted PIN.

3. The system of claim 2, wherein generating the server PIN comprises retrieving a customer PIN associated with a customer, wherein the server PIN is generated based at least in part on the customer PIN.

4. The system of claim 2, wherein generating the server PIN comprises generating a random PIN, wherein the server PIN may be based at least in part on the random PIN.

5. The system of claim 1, wherein the module is further configured to cause the processor to disable the server token after the system has authenticated the device token associated with the server token, thereby preventing the system from authenticating a second device token associated with the server token a second time.

6. The system of claim 1, wherein the module is further configured to cause the processor to:
- receive a transaction communication from the ATM wherein the transaction communication comprises an amount of money and the device token; and
- debit a financial account, by the amount of money, associated with the device token.

7. The system of claim 1, wherein the module is further configured to cause the processor to store an identification marker for the first mobile device associated with the server token;
- wherein the security packet further comprises a device identification marker for the first mobile device; and
- wherein, authenticating the device token further comprises comparing the stored identification marker for the first mobile device and the device identification marker in the security packet.

8. The system of claim 1, wherein authenticating the device token comprises decrypting both the server token and the device token, wherein authenticating the device token further comprises comparing the decrypted device token with the decrypted server token, thereby resulting in a successful authentication of the device token.

9. The system of claim 1, wherein the security packet further comprises global position information about the ATM.

10. A method for managing financial tokens associated with a financial account, whereby the method generates and authenticates tokens associated with the financial account in order to grant access to a user to conduct financial transactions on the financial account using an Automated Teller Machine (ATM) via a mobile device, the method comprising:
- providing an Automated Teller Machine (ATM) with a first Near Field Communication (NFC) transmitter;
- generating, via a computing device processor, a server token, wherein the server token is associated with at least one financial account;
- encrypting, via a computing device processor, the server token using an encryption algorithm, wherein the server token is encrypted at least in part based on time;
- communicating, via a computing device processor, to a first mobile device, a server packet, wherein the server packet comprises at least the encrypted server token, wherein the first mobile device has paired with the ATM via a second Near Field Communication (NFC) transmitter on the first mobile device and the first NFC transmitter of the ATM;
- receiving, via a computing device processor, from the ATM, a security packet, wherein the security packet comprises at least a device token communicated from the first mobile device to the ATM and an identification marker of the ATM;
  - wherein the device token is encrypted at least in part based on time,
  - wherein the device token is encrypted using the encryption algorithm used to encrypt the server token;
- determining, via a computing device processor, that the ATM is authorized for use, wherein determining the ATM is authorized for use comprises comparing the received identification marker of the ATM with a list of identification markers accessible by the system;
- upon determining that the ATM is authorized for use, authenticating, via a computing device processor, the device token, the authentication comprising comparing the device token with the server token, thereby resulting in a successful authentication of the device token; and communicating, via a computing device processor, the successful authentication to the ATM.

11. The method of claim 10, wherein the method further comprises:
generating, via a computing device processor, a server personal identification number (PIN), wherein the server PIN is a sequence of characters;
associating, via a computing device processor, the server PIN with the server token;
wherein the server packet further comprises the server PIN, wherein the server PIN comprises a sequence of characters;
wherein the security packet further comprises a user inputted PIN; and
wherein, authenticating the device token further comprises comparing the server PIN with the user submitted PIN.

12. The method of claim 11, wherein generating the server PIN comprises retrieving, via a computing device processor, a customer PIN associated with a customer, wherein the server PIN is generated based at least in part on the customer PIN.

13. The method of claim 11, wherein generating the server PIN comprises generating, via a computing device processor, a random PIN, wherein the server PIN may be based at least in part on the random PIN.

14. The method of claim 10, wherein the method further comprises disabling, via a computing device processor, the server token after authenticating the device token associated with the server token, thereby preventing authentication of a second device token associated with the server token a second time.

15. The method of claim 10, wherein the method further comprises:
receiving, via a computing device processor, a transaction communication from the ATM wherein the transaction communication comprises an amount of money and the device token; and
debiting, via a computing device processor, a financial account by the amount of money associated with the device token.

16. The method of claim 10, wherein the method further comprises storing, via a computing device processor, an identification marker for the first mobile device associated with the server token;
wherein the security packet further comprises a device identification marker for the first mobile device; and
wherein, authenticating the device token further comprises comparing, via a computing device processor, the stored identification marker for the first mobile device and the device identification marker in the security packet.

17. The method of claim 10, wherein authenticating the device token comprises decrypting, via a computing device processor, both the server token and the device token, wherein authenticating the device token further comprises comparing, via a computing device processor, the decrypted device token with the decrypted server token, thereby resulting in a successful authentication of the device token.

18. The method of claim 10, wherein the security packet further comprises global position information about the ATM.

19. A computer program product for managing financial tokens associated with a financial account, whereby the product generates and authenticates tokens associated with the financial account in order to grant access to a user to conduct financial transactions on the financial account using an Automated Teller Machine (ATM) via a mobile device, the computer program product comprising non-transitory computer-readable, medium comprising code causing an apparatus to:
generate a server token, wherein the server token is associated with at least one financial account;
encrypt the server token using an encryption algorithm, wherein the server token is encrypted at least in part based on time;
communicate, to a first mobile device, a server packet, wherein the server packet comprises at least the encrypted server token, wherein the first mobile device has paired with an ATM via a second Near Field Communication (NFC) transmitter on the first mobile device and a first NFC transmitter of the ATM;
receive, from the ATM, a security packet, wherein the security packet comprises at least a device token communicated from the first mobile device to the ATM and an identification marker of the ATM;
wherein the device token is encrypted at least in part based on time,
wherein the device token is encrypted using the encryption algorithm used to encrypt the server token;
determine that the ATM is authorized for use, wherein determining the ATM is authorized for use comprises comparing the received identification marker of the ATM with a list of identification markers accessible by the system;
upon determining that the ATM is authorized for use, authenticate the device token, the authentication comprising comparing the device token with the server token, thereby resulting in a successful authentication of the device token; and
communicate the successful authentication to the ATM.

20. The computer program product of claim 19, wherein the code further causes the apparatus to:
generate a server personal identification number (PIN), wherein the server PIN is a sequence of characters; and
associate the server PIN with the server token;
wherein, the server packet further comprises the server PIN, wherein the server PIN comprises a sequence of characters;
wherein, the security packet further comprises a user inputted PIN; and
wherein, authenticating the device token further comprises comparing the server PIN with the user submitted PIN.

21. The computer program product of claim 20, wherein generating the server PIN comprises retrieving a customer PIN associated with a customer, wherein the server PIN is generated at least in part on the customer PIN.

22. The computer program product of claim 20, wherein generating the server PIN comprises generating a random PIN, wherein the server PIN may be based at least in part on the random PIN.

23. The computer program product of claim 19, wherein the program is further configured to cause the apparatus to disable the server token after the system has authenticated the device token associated with the server token, thereby preventing the system from authenticating a second device token associated with the server token a second time.

24. The computer program product of claim 19, wherein the program is further configured to cause the apparatus to:

receive a transaction communication from the ATM wherein the transaction communication comprises an amount of money and the device token; and debit a financial account, by the amount of money, associated with the device token.

25. The computer program product of claim 19, wherein the program is further configured to cause the apparatus to store an identification marker for the first mobile device associated with the server token;

wherein the security packet further comprises a device identification marker for the first mobile device; and wherein, authenticating the device token further comprises comparing the stored identification marker for the first mobile device and the device identification marker in the security packet.

* * * * *